US010321261B2

(12) United States Patent
Hofleitner et al.

(10) Patent No.: US 10,321,261 B2
(45) Date of Patent: Jun. 11, 2019

(54) TECHNIQUES FOR WIRELESS TRANSMITTER LOCATION DETECTION

(71) Applicant: Facebook, Inc., Menlo Park, CA (US)

(72) Inventors: Aude Hofleitner, San Francisco, CA (US); Pierre Moreels, San Jose, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/829,156

(22) Filed: Dec. 1, 2017

(65) Prior Publication Data

US 2018/0091934 A1    Mar. 29, 2018

Related U.S. Application Data

(63) Continuation of application No. 13/724,758, filed on Dec. 21, 2012, now Pat. No. 9,838,834.

(51) Int. Cl.
*H04W 4/02*    (2018.01)
(52) U.S. Cl.
CPC .................... *H04W 4/02* (2013.01)
(58) Field of Classification Search
CPC ......... H04W 4/02; H04W 8/205; H04W 4/60; H04W 12/02; H04W 4/70
USPC ......................................................... 455/456
See application file for complete search history.

(56) References Cited

U.S. PATENT DOCUMENTS

| 9,332,387 | B2* | 5/2016 | Davis | H04W 4/021 |
| 2006/0239338 | A1* | 10/2006 | Kolanek | H04L 27/0012 |
| | | | | 375/224 |
| 2009/0042557 | A1* | 2/2009 | Vardi | H04W 72/02 |
| | | | | 455/422.1 |
| 2012/0184292 | A1* | 7/2012 | Lin | H04W 24/10 |
| | | | | 455/456.1 |
| 2012/0322459 | A1* | 12/2012 | Jaffri | G01S 1/68 |
| | | | | 455/456.1 |

* cited by examiner

*Primary Examiner* — Said M Elnoubi

(57) ABSTRACT

Techniques for wireless transmitter location detection are described. An apparatus may comprise a processor circuit and a location database generator component. The location database generator component may comprise: a logging component operative on the processor circuit to receive a plurality of location data packages, the location data packages comprising locations and associated wireless transmitter identifiers, and to log the location data packages into a location database, the location database comprising a plurality of tuples of the locations and the wireless transmitter identifiers; and an analysis component operative on the processor circuit to construct a transmitter mapping from wireless transmitter identifiers to locations based on the plurality of tuples of the location database. Other embodiments are described and claimed.

13 Claims, 28 Drawing Sheets

*2500*

Receive a request for location assistance from a mobile device, the request comprising a wireless transmitter identifier
*2502*

Apply a transmitter mapping to the wireless transmitter identifier to determine a location
*2504*

Transmit a response to the request for location assistance to the mobile device, the response comprising the determined location
*2506*

2000

*Receive a plurality of location data packages from a plurality of mobile devices, the location data packages comprising locations and wireless transmitter identifiers*
*2002*

*Log the plurality of location data packages into a location database, the location database comprising tuples of locations and wireless transmitter identifiers*
*2004*

*Construct a transmitter mapping from wireless transmitter identifiers to locations based on the location database*
*2006*

FIG. 20

Transmitter Mapping 2300

| Wireless Transmitter Identifiers 2310 | | Wireless Transmitter Locations 2320 | |
|---|---|---|---|
| Identifier 2311 | 20018-264 | Location 2321 | S 25.12, W 30.74 |
| Identifier 2312 | 19456-101 | Location 2322 | S 15.89, W 53.28 |
| Identifier 2313 | 08254-856 | Location 2323a | N 30.32, W 86.14 |
| | | Location 2323b | N 25.46, W 84.08 |
| Identifier 2314 | 08254-858 | Location 2324 | N 30.18, W 86.03 |
| Identifier 2315 | 03215-967 | Location 2325 | N 50.99, E 56.34 |

*FIG. 23*

TECHNIQUES FOR WIRELESS TRANSMITTER LOCATION DETECTION

CROSS-REFERENCE TO RELATED APPLICATIONS

This application is a continuation of, claims the benefit of and priority to, previously filed U.S. application Ser. No. 13/724,758, filed Dec. 21, 2012, titled "TECHNIQUES FOR WIRELESS TRANSMITTER LOCATION DETECTION," of which is incorporated herein by reference in its entirety.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for wireless transmitter location detection. Some embodiments are particularly directed to techniques for centralized wireless transmitter location detection using data collected from a plurality of mobile devices.

In one embodiment, an apparatus may include a location database generator component. The location database generator component may comprise a logging component and/or an analysis component. The logging component may be operative to receive a plurality of location data packages, the location data packages comprising locations and associated wireless transmitter identifiers, and to log the location data packages into a location database. The location database may comprise a plurality of tuples of the locations and the wireless transmitter identifiers. The analysis component may be operative to construct a transmitter mapping from wireless transmitter identifiers to locations based on the plurality of tuples of the location database. Other embodiments are described and claimed.

In one embodiment, an apparatus may comprise a location estimation component operative to receive a request for location assistance from a mobile device, the request comprising a wireless transmitter identifier. The location estimation component may apply a transmitter mapping to the wireless transmitter identifier to determine a location, and transmit a response to the request for location assistance to the mobile device, the response comprising the determined location. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 20 illustrates a first logic flow for the location system of FIG. 1.

FIG. 23 illustrates a transmitter mapping table as the continuation of the example of FIG. 22 of providing location services to a mobile device.

DETAILED DESCRIPTION

Figure 1:
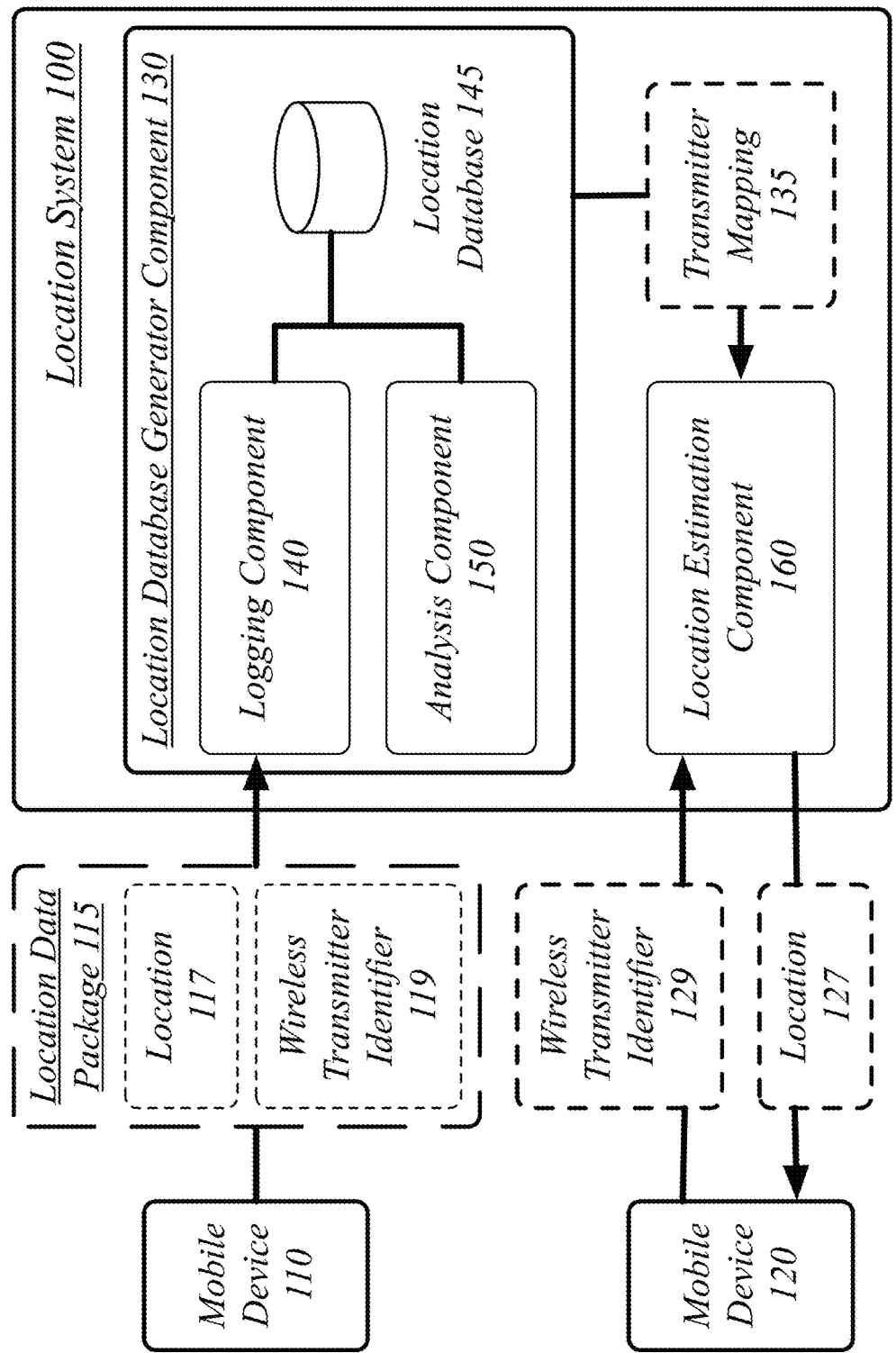
FIG. 1 illustrates an embodiment of a location system.

Various embodiments are generally directed to techniques for wireless transmitter location detection. Some embodiments are particularly directed to techniques for centralized wireless transmitter location detection using data collected from a plurality of mobile devices.

A mobile device with wireless network access and knowledge of its location can leverage the two together to expand its utility to a user. Unfortunately some devices lack the ability to directly determine their own location. However, a device able to communicate with a wireless transmitter is, by definition, within the coverage area of that transmitter. A location system able to inform a mobile device of a location and coverage area of a wireless transmitter to which it is connected can therefore make it possible for the mobile device to take advantage of location services that would otherwise be unavailable.

However, such assistance is only possible if the location system has knowledge of the location of the wireless transmitter to which the mobile device is connected. Fortunately, every time a mobile device uses a location device (e.g., a GPS receiver) to determine its location and a wireless transmitter to access a location service, that mobile device has gained knowledge that the location is within the coverage area of the wireless transmitter. Given enough such data points, a fairly precise estimate may be made of that coverage area. The determined coverage area can be used to provide location assistance to devices connected to that wireless transmitter which otherwise lack the ability to determine their own location. By collecting and analyzing the data already being generated by location-detection-capable mobile devices, a host of location services can be provided to devices without such capabilities.

Traditional personal computing devices may connect to a network (e.g., the Internet) using a variety of wired technologies, such as network interfaces, dial-up modems, cable modems, asymmetric digital subscriber lines (ADSL), fiber optics, etc. In a mobile world, it is highly desirable for mobile devices to use wireless technologies to connect to networks in order to provide such services as granting connectivity to a mobile user during transit, providing Internet access over a wide geographical area, eliminating the inconvenience of having to connect a mobile device to a stationary wired outlet, and allowing multiple users to connect their devices to the same access point without competing for limited physical outlets. As such, a single mobile device may be operated by a user over a wide geographic area.

Some uses of wireless Internet access across varying locations is merely a duplication of Internet tasks which might otherwise be performed at a stationary, wired device, such as providing the power of an Internet-enabled device with the convenience and constant availability of a mobile device. However, some uses of wireless Internet access leverage the mobility of a device to provide location-based services. Of course, location-based services may be desirable even in a stationary device: a user searching for a restaurant in a home computer may still be benefited by receiving options near their home. However, mobile devices offer expanded opportunities for location-based services because location-based services frequently involve assisting a user in an unfamiliar location or a user desiring to travel to another location: searching for directions, local restaurant recommendations, detecting nearby associates, social networking status updates, and a host of other uses.

Techniques for detecting the location of a mobile device vary. Most basically a user might be queried as to their current location and respond in text form with, for example, an address. However, this technique is inconvenient, lacks the automation that users expect, and eliminates the highly-desirable location-based service of informing a lost user of their current location. Conveniently some mobile devices contain specialized hardware for the specific purpose of determining location, such as a Global Positioning System (GPS) receiver capable of detecting GPS signals and interpreting them to determine an approximate location. However, some devices lack such hardware but would still be capable of providing access to location-based services to a user if their location could be determined.

As such, it is desirable to assist devices lacking hardware specific to location detection in determining their location. A mobile device capable of wireless communication may have, by virtue of being able to detect a wireless transmission, indirect information about its location. The ability to detect a wireless transmission with a particular piece of wireless hardware is limited in geographic area, with said area varying according to the capability of the wireless transmitter, the mobile device's wireless receiver, and the geography and general environment across which a wireless transmission is being broadcast. A mobile device detecting a wireless transmission may therefore determine that it is within the geographic area in which its wireless hardware is capable of detecting the broadcast of that wireless transmission, an area generally corresponding to the physical location of the wireless transmitter.

Many types of wireless transmitters have associated with them—and therefore with their wireless transmissions—a wireless transmitter identifier of some type. When a wireless transmitter is in a fixed location, the wireless transmitter identifier may therefore have associated with it a geographic area corresponding to the area in which its associated wireless transmissions are detectable by typical mobile device wireless hardware. However, determining such an association between wireless transmitter identifiers and geographic locations is a non-trivial task. The United States, for example, contains millions of wireless transmitters—cell sites, Wi-Fi access points, etc.—which are maintained by a wide variety of administrators, including public, private, and individual. Consequently, a program to directly seek out the locations of wireless transmitters may be prohibitively costly and time-consuming.

Therefore it is desirable to automate the process of determining the locations of wireless transmitters by piggy-backing on other mobile user tasks to include the logging of locations and wireless transmitter identifiers. A user of a mobile device with location-detection-specific hardware may use this hardware to determine a location, such as a GPS location, while connected to a wireless transmitter for Internet access. Such a device has then indirectly learned information relevant to determining the location of a wireless transmitter, that is, while a specific GPS reading was made the device was within the geographic area covered by the wireless transmission. As such, an association may be made between the wireless transmitter identifier and a geographic location. With a sufficient number of these readings, the geographic area covered by the wireless transmissions may be determined with a fairly high degree of precision. However, such a process has several problems which must be overcome.

One problem is that mobile devices, capabilities notwithstanding, may simply not be designed for data collection. For instance, a wireless-capable mobile device may simultaneously be aware of multiple wireless transmitters: multiple Wi-Fi access points may be detectable, multiple cell sites may be within range, and so forth. However, a software application on the device, if lacking access to operating-system-protected resources, may only be aware of the one or more wireless transmitters the device is currently connected to for wireless Internet access, such as a single cell site and/or a single Wi-Fi network. Similarly, while the wireless communications hardware and software of a device may have signal strength information for wireless transmissions—the magnitude of the detected electric field for the transmission, such as may be expressed in decibel-microvolts per meter (dBµV/m)—the signal strength information may not be made available to software applications on the device. As such, it may be desirable to have a process for associating wireless transmitters with geographic locations capable of transcending the limitations on the information available to software applications so as to be able to leverage, for example, a wide install base of mobile software applications with a primary purpose other than this data collection. For example, users of an Internet-based service that encourages users to check into the service—such as a social networking service—may frequently send location data to the service. The service may therefore be operative to collect this location data as part of its normal operation.

As users have concerns regarding their personal privacy, they may be given the opportunity to opt-in or opt-out of submitting location data. For example, an application, module, library, or other computer element may ask the user whether they wish to opt-in to sharing location data with an Internet-based service. Alternatively, the user may be given the opportunity to opt-out of sharing location data. In either case, users may have control of whether or not they share location data with an Internet-based service.

Another potential problem is that the gathered information in raw form may be insufficient for data collection purposes, and therefore such raw data may need further analysis and filtering prior to being suitable for aiding in location detection. In some instances, multiple distinct, geographically-separate wireless transmitters may share a wireless transmitter identifier. This may be because, for example, multiple providers of wireless Internet access fail to coordinate so as to ensure unique identifiers. Alternatively or additionally, the limited information available to a software application may lack a necessary component which, if available, would allow for the unique identification of a wireless transmitter. Whatever the cause, multiple distinct, geographically-separate wireless transmitters sharing a wireless transmitter identifier complicates the process of associating wireless transmitter identifiers with geographic locations. For the data-collection problem, a single identifier will be associated with multiple transmitters such that each associated location must first be associated with a particular transmitter before the location of each transmitter may be approximated. For the location-assistance problem, a determination needs to be made as to which transmitter of the plurality of transmitters is responsible for the wireless transmission with the associated identifier before the proper geographic area can be returned to the device. Successfully solving these problems allows for the correct association of wireless transmitter identifiers and geographic areas, and the correct providing of location information to devices based on wireless transmitter identifiers. As a result, the embodiments can improve the affordability and scalability of collecting data for location-based services and improve the extendibility of such services to devices lacking location-determination-specific hardware.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a location system 100. In one embodiment, the location system 100 may comprise a computer-implemented location system 100 having a location database generator component 130 and a location estimation component 160, each comprising one or more components. Although the location system 100 shown in FIG. 1 has a limited number of elements in a certain topology, it may be appreciated that the location system 100 may include more or less elements in alternate topologies as desired for a given implementation.

The location system 100 may comprise a location database generator component 130. The location database generator component 130 may be generally operative to receive a plurality of locations and associated wireless transmitter identifiers and to construct a transmitter mapping 135 from wireless transmitter identifiers to locations based on the received data. The location system 100 may further comprise a location estimation component 160. The location estimation component 160 may be generally operative to use the transmitter mapping 135 to provide location assistance to mobile devices, such as those mobile devices that do not have access to native location services (e.g., a GPS device) or desires to conserve power of such native location services.

The location database generator component 130 may comprise a logging component 140. The logging component 140 may be generally operative to receive a plurality of location data packages 115 from one or more mobile devices 110. A location data package 115 may comprise locations and associated wireless transmitter identifiers 119 detected by a mobile device 110. The logging component 140 may log the location data packages 119 into a location database 145. The location database 145 may comprise, among other types of information, a plurality of tuples of the locations and the wireless transmitter identifiers.

For instance, a mobile device 110 may transmit to the logging component 140, a location data package 115. The location data package 115 may comprise a representative example of the plurality of location data packages. The location data package 115 comprises a location 117 and a wireless transmitter identifier 119. The location 117 and the wireless transmitter identifier 119 are associated with each other, that association comprising a representation by the mobile device 110 that the location 117 in some way corresponds to a geographic area covered by a wireless transmitter identifying itself by the wireless transmitter identifier 119. The location data package 115 may be submitted by the mobile device 110 automatically in response to a software application on the mobile device 110 recognizing that the mobile device 110 has current information of its location 117 and a currently-connected wireless transmitter identifier 119. The logging component 140 may be operative to receive the location data package 115 from the mobile device 110 automatically from a mobile device 110 in response to the software application on the mobile device 110 recognizing that the mobile device 110 has current information of its location 117 and the connected wireless transmitter identifier 119.

In some embodiments, the location data package 115 may be transmitted to, and received by, the logging component 140 as part of another communication between the mobile device 110 and a service of which the location system 100 is a part. For example, location system 100 may be part of a plurality of network-based services wherein, when possible, a mobile device 110 using the network-based services will include the location data package 115 with its communication with those services when it has current information of its location 117 and the connected wireless transmitter identifier 119. In some cases, the information contained within location data package 115 may be unrelated to the network-based service in use by the mobile device 110, the location data package 115 sent purely to enhance the location database 145. In other cases, some or all of the information contained within location data package 115 may be used by other network-based services in addition to being used by the location system 100. For example, a mobile device 110 requesting a localized restaurant recommendation may transmit its location 117 in order to utilize the location-based service but also include the wireless transmitter identifier 119 in order to assist the location system 100.

The location 117 may be represented in a number of different formats and may have been determined according to a number of different techniques. It will be appreciated that for the plurality of received location data packages 115 different methods of determining the locations may have been used by different mobile devices or by the same mobile device in different instances. Example techniques and devices are described with reference to FIG. 16.

In some cases, the location 117 may be expressed as a latitude-longitude pair. In other cases, the location 117 may be expressed as latitude-longitude-altitude coordinates. In still other cases, or in combination, the location 117 may be expressed as a street address, such as one or more of building number, street, city, state, country, and zip code. As different representations of locations are generally transformable between each other—a street address may be converted to a latitude-longitude pair using a map or mapping system—any known method of representing location 117 may be used and transformed into a common representation by the logging component 140, such as latitude-longitude pairs.

The location database 145 may comprise a database created and maintained according to any one of the known techniques for creating and maintaining a database. In general, the location database 145 may consist of any method of storing and retrieving tuples of associated locations and wireless transmitter identifiers, whether or not the tuples are stored in a product or library specifically titled as a database.

The location database generator component 130 may comprise an analysis component 150. The analysis component 150 may be operative to construct a transmitter mapping 135 from wireless transmitter identifiers to locations based on the plurality of tuples of the location database 145. A transmitter mapping 135 may comprise a set of relationships wherein for each wireless transmitter identifier 119 as part of the transmitter mapping 135 at least one location 117 is given as being associated with the wireless transmitter identifier 119. In general, the transmitter mapping 135 will only contain multiple locations for a single wireless transmitter identifier 119 if multiple wireless transmitters use the same wireless transmitter identifier 119. Rather than measured locations of individual mobile devices, the locations of the transmitter mapping 135 are representations of the geographic areas covered by wireless transmitters with the associated wireless transmitter identifiers 119. A particular entry in the transmitter mapping 135 will, therefore, have one mapped location for each wireless transmitter with the associated wireless transmitter identifier 119. A wireless transmitter with a unique wireless transmitter identifier 119 will have a single location listed for that unique wireless transmitter identifier 119. Wireless transmitters with identical wireless transmitter identifiers 119 will have multiple mapped locations, one mapped location for each wireless transmitter with the common identifier.

The location system 100 may comprise a location estimation component 160. The location estimation component 160 may be operative to, among other operations, receive a request for location assistance from a mobile device 120. The request may comprise a wireless transmitter identifier 129. The location estimation component 160 may apply a transmitter mapping 135 to the wireless transmitter identifier 129 to determine a location 127 of a wireless transmitter corresponding to the wireless transmitter identifier 129. The location estimation component 160 may then transmit a response to the request for location assistance to the mobile device 120, the response comprising the determined location 127.

In some cases, the mobile device 120 may comprise a mobile device without dedicated hardware for the determination of a location, such as a mobile device lacking GPS or similar hardware. Alternatively, the mobile device 120 may possess GPS or similar hardware but may be refraining from using it to take advantage of the power savings of leaving that hardware in a low-power or unpowered state. The embodiments are not limited to these two particular use scenarios, and can be applied to any mobile device 120 in need of location assistance, such as for location-based services, for example.

A request for location assistance may be received in a number of different forms. In one case, a request for location assistance may be directly requested from the mobile device 120 to the location system 100 for assistance in determining its current location.

Alternatively or additionally the location 127 may be transmitted along with other useful information, such as information generated as part of a location-based service. In many cases, the information generated by the location-based service may make use of the generated location 127 in providing its services. For example, the mobile device 120 may transmit the wireless transmitter identifier 129 from the mobile device 120 to the location system 100 as part of a request for a location-based service such as a location-based restaurant recommendation service. In this example, the location 127 would then be transmitted back to the mobile device 120 along with generated restaurant recommendations, the restaurant recommendations based on the determined location 127. In some embodiments where location system 100 is working in concert with a location-based service the results of the location-based service, such as one or more restaurant recommendations, may comprise the content sent from the location system 100 to the mobile device 120, with the determined location 127 not explicitly included in the response to the mobile device 120.

Figure 2:
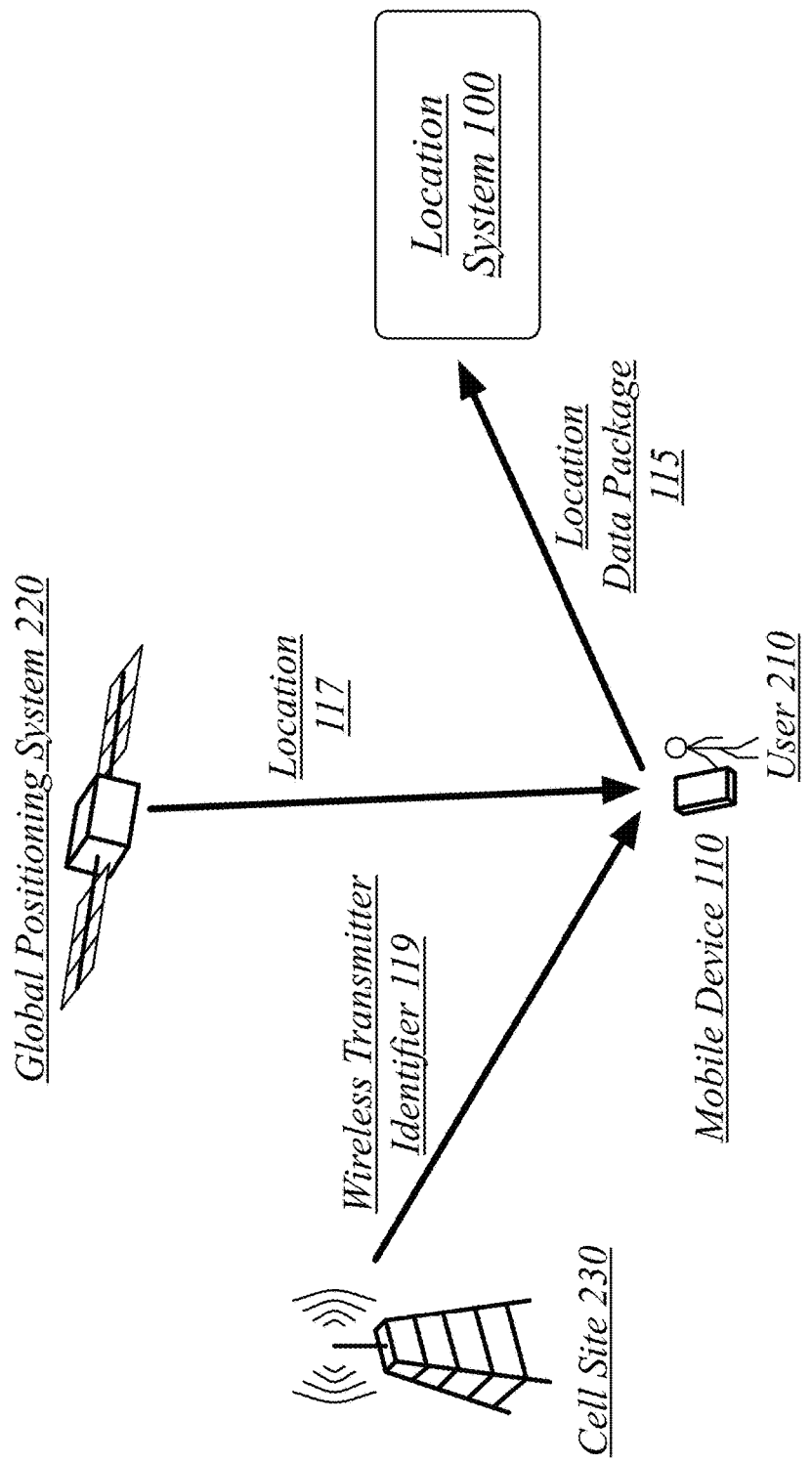
FIG. 2 illustrates an operating environment for the location system involving logging information for a mobile device using a cell site and the global positioning system.

FIG. 2 illustrates an embodiment of an operating environment 200 for the location system 100. As shown in FIG. 2, with reference to FIG. 1, a user 210 is using the mobile device 110.

As depicted, in some embodiments, the location 117 may have been determined using the global positioning system 220 and may comprise a GPS location of mobile device 110 as determined by GPS hardware of the mobile device 110. In general, one or more of the locations of the received plurality of location data packages may comprise global positioning system locations of mobile devices.

A wireless transmitter identifier 119 may identify a wireless transmitter. In some embodiments, a wireless transmitter may be implemented at a fixed location, and provide access to a network via different types of wireless mobile broadband technologies. Wireless mobile broadband technologies may include any wireless technologies suitable for use with mobile devices, such as one or more third generation (3G) or fourth generation (4G) wireless standards, revisions, progeny and variants. Examples of wireless mobile broadband technologies may include without limitation any of the Institute of Electrical and Electronics Engineers (IEEE) 802.11 standards, IEEE 802.16m and IEEE 802.16p standards, 3rd Generation Partnership Project (3GPP) Long Term Evolution (LTE) and LTE-Advanced (LTE ADV) standards, and International Mobile Telecommunications Advanced (IMT-ADV) standards, including their revisions, progeny and variants. Other suitable examples may include without limitation Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8 and 9 of LTE/System Architecture Evolution (SAE), and so forth. The embodiments are not limited in this context.

As depicted, in some cases, the wireless transmitter identified by the wireless transmitter identifier 119 may be a cell site 230. In one embodiment, a cell site 230 may comprise any transmitter operative to transmit and receive cellular telephone and/or cellular data signals to and from a cellular device. For instance, a cell site 230 may correspond to a base transceiver station, such as an Evolved Node B (eNodeB or eNB), which comprises an element of an Evolved Universal Mobile Telecommunications System (UMTS) Terrestrial Radio Access (E-UTRA) of a LTE or LTE-A system, among other types of network elements. As such, in some embodiments, the wireless transmitter identifier 119 may comprise an identifier number for the cell site 230 such as a cell site identifier (ID). The wireless transmitter identifier 119 may comprise an identifier number for the cell site 230 the mobile device 110 was connected to while determining the location 117. In general, one or more of the wireless transmitter identifiers 119 of the received plurality of location data packages 115 may comprise identifier numbers for cell sites 230 that mobile devices 110 were connected to while determining one or more of the locations 117.

As shown in FIG. 2, a user 210 is operating mobile device 110 while connected to cell site 230 and determining location 117 using the global positioning system 220. In some cases, the mobile device 110 may have determined location 117 in order to assist in providing location services to user 210 in coordination with a location-based service accessed using cell site 230. In these cases, the transmission of location data package 115, which contains wireless transmitter identifier 119 and location 117, would be piggybacking off the location determination made by the mobile device 110 for the location services. Alternatively, mobile device 110 may have activated for another reason, such as user 210 using functionality of the mobile device 110 which doesn't require the location. In these cases, the determination of location 117 using the global positioning system 220 may have been specifically initiated in order to create the location data package 115 for transmission to the location system 100. For example, the user may have activated a software application on the mobile device 110 operative to, in addition to one or more primary functions, detect when sufficient information exist for a location data package 115 can be built, build the location data package 115, and then send it to the location system 100. In either case, the transmission of location data package 115 to the location system 100 may use any suitable data connection between mobile device 110 and a network device implementing the location system 100, which in some cases may be via the cell site 230.

Figure 3:
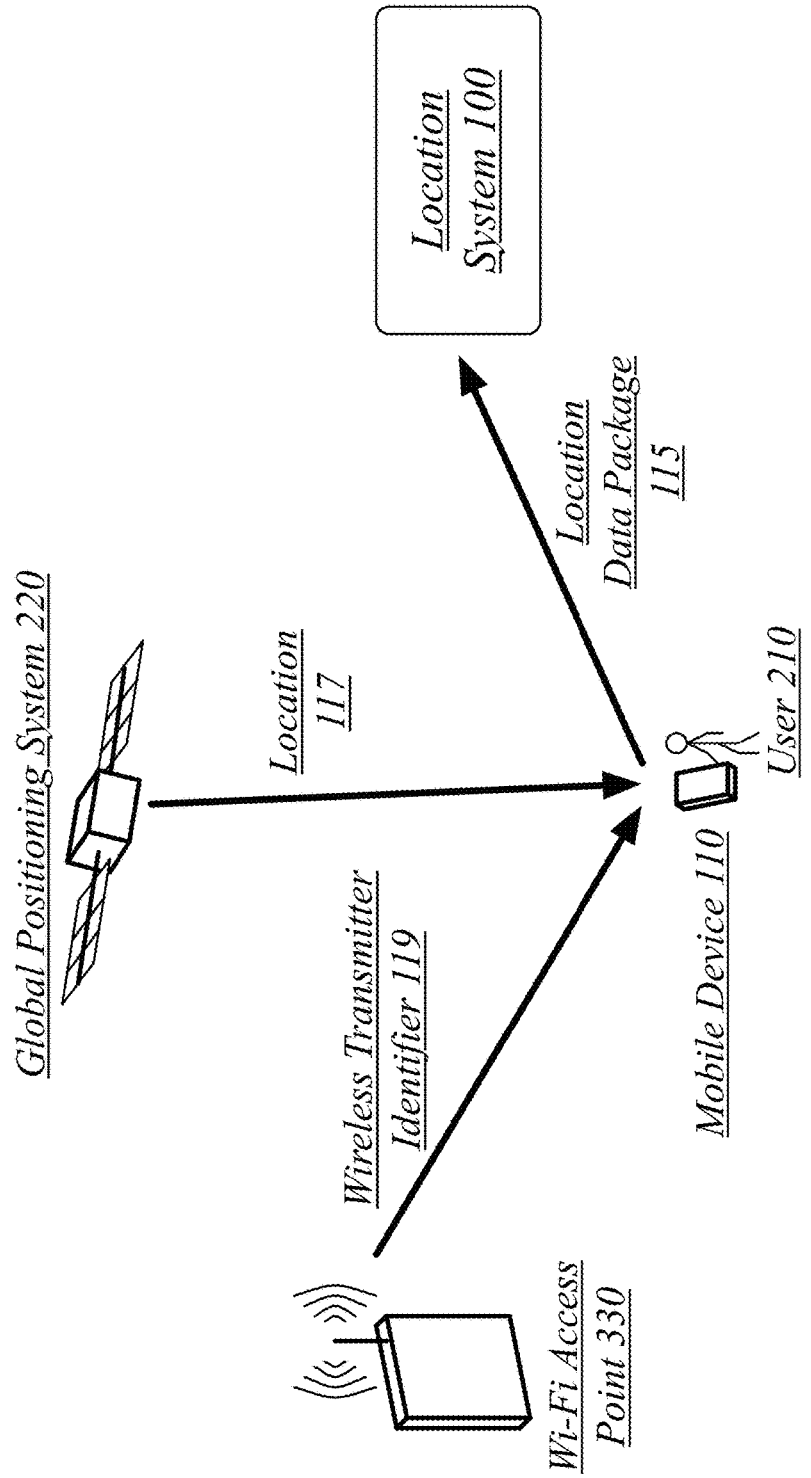
FIG. 3 illustrates an operating environment for the location system involving logging information for a mobile device using an Institute of Electrical and Electronics Engineers (IEEE) 802.11 ("Wi-Fi") access point with the global positioning system.

FIG. 3 illustrates an embodiment of an operating environment 300 for the location system 100. As shown in FIG. 3, with reference to FIG. 1 and FIG. 2, the user 210 is still using mobile device 110. However, in this illustrated embodiment the mobile device 110 is connected to an IEEE 802.11x (e.g., a, b, g, n, ac, etc.) ("Wi-Fi") access point 330. The Wi-Fi access point 330 may comprise any transmitter operative to transmit and receive Wi-Fi signals to and from the mobile device 110. A Wi-Fi access point 330 may provide a local area Wi-Fi network, a wide area Wi-Fi network, or any other known type of Wi-Fi network.

As such, in some embodiments, the wireless transmitter identifier 119 may comprise an identifier number for the Wi-Fi access point 330. The wireless transmitter identifier 119 may comprise an identifier number for the Wi-Fi access point 330 the mobile device 110 was connected to while determining location 117. In general, one or more of the wireless transmitter identifiers 119 of the received plurality of location data packages 115 may comprise identifier numbers for Wi-Fi access points 330 mobile devices 110 were connected to while determining one or more of the locations 117.

As shown in FIG. 3, the user 210 is operating mobile device 110 while connected to Wi-Fi access point 330 and determining location 117 using the global positioning system 220. In some cases, the mobile device 110 may have determined location 117 in order to assist in proving location services to user 210 in coordination with a location-based service accessed using Wi-Fi access point 330. In these cases, the transmission of location data package 115, which contains wireless transmitter identifier 119 and location 117, would be piggybacking off the location determination made by the mobile device 110 for the location services. Alternatively, mobile device 110 may have activated for another reason, such as user 210 using functionality of the mobile device 110 which doesn't require the location. In these cases, the determination of location 117 using the global positioning system 220 may have been initiated in order to create the location data package 115 for transmission to the location system 100. For example, the user may have activated a software application on the device operative to, in addition to one or more primary functions, detect when sufficient information exist for a location data package 115 can be built, build the location data package 115, and then send it to the location system 100. In either case, the transmission of location data package 115 to the location system 100 may use a data connection between mobile device 110 and Wi-Fi access point 330.

It will be appreciated that in some cases a mobile device 110 might be connected to both a cell site 230 and a Wi-Fi access point 330. For example, the mobile device 110 might maintain a connection to cell site 230 in order to receive cellular telephone calls, but use the Wi-Fi access point 330 for data services. In these cases the location data package 115 may comprise two wireless transmitter identifiers 119, one for the cell site 230 and one for the Wi-Fi access point 330. In general, if a mobile device 110 is connected to a plurality of wireless transmitters it may include multiple wireless transmitter identifiers 119, one each for each of the connected wireless transmitters. Alternatively, if a mobile device 110 is connected to a plurality of wireless transmitters it may send multiple location data packages 115 to the location system 100, one each for each of the connected wireless transmitters, each one containing one of the wireless transmitter identifiers along with the location 117.

Figure 4:
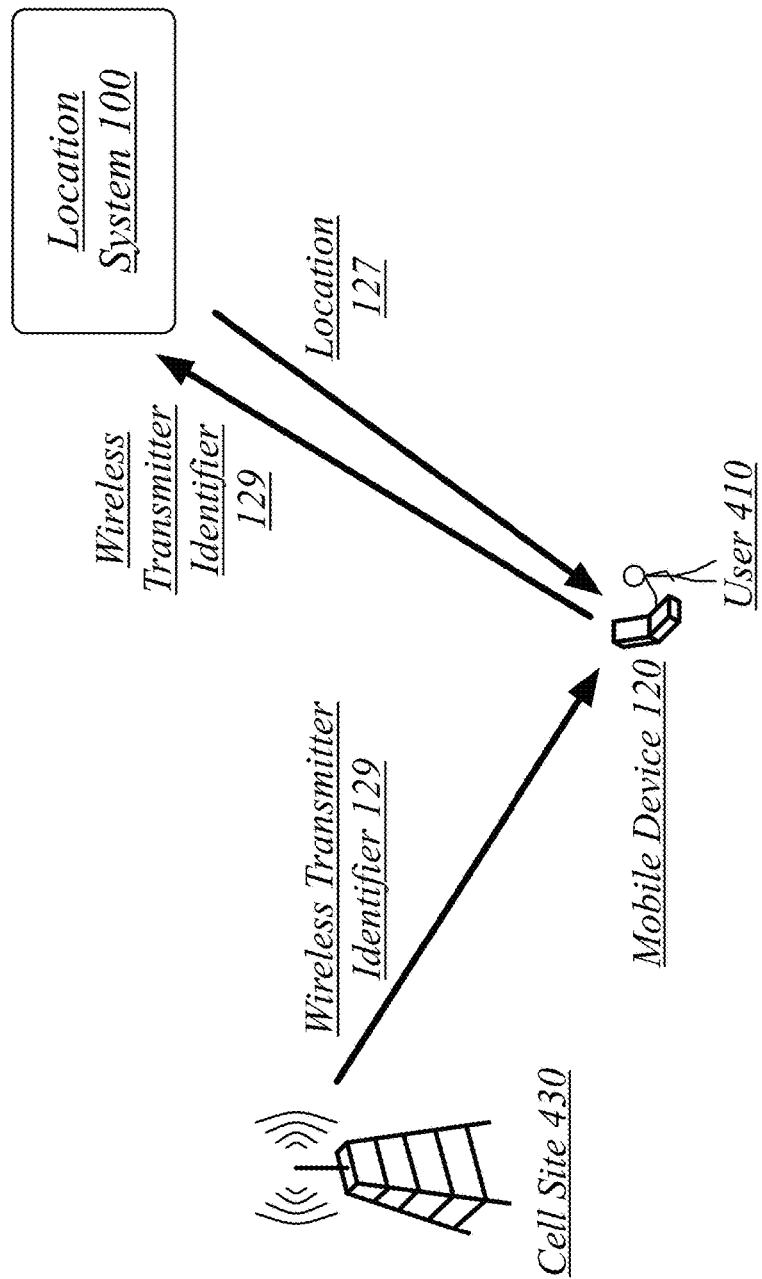
FIG. 4 illustrates an operating environment for the location system involving determining a location for a mobile device using a cell site.

FIG. 4 illustrates an embodiment of an operating environment 400 for the location system 100. As shown in FIG. 4, with reference to FIG. 1, a user 410 is using the mobile device 120. As previously discussed, the mobile device 120 may not possess or may not be currently using location-detection specific hardware. However, user 410 may desire to learn their location, receive the output of a location-based service based on their current location, or both.

As depicted, in some cases, the wireless transmitter identified by the wireless transmitter identifier 129 may be a cell site 430. A cell site 430 may comprise any transmitter operative to transmit and receive cellular telephone and/or cellular data signals to and from a cellular device. A cell site 430 may correspond to a base transceiver station, such as an eNodeB, for example. As such, in some embodiments, the wireless transmitter identifier 129 may comprise an identifier number for the cell site 430. In some cases, the wireless transmitter identifier 129 may comprise an identifier number for the cell site 430 the mobile device 110 was connected to while constructing a request for location assistance or a location-based service. Embodiments are not limited to this example.

Alternatively, in some cases, the wireless transmitter identified by the wireless transmitter identifier 129 may be a Wi-Fi access point. A Wi-Fi access point may comprise any transmitter operative to transmit and receive Wi-Fi signals to and from the mobile device 120. A Wi-Fi access point may provide a local area Wi-Fi network, a wide area Wi-Fi network, or any other known type of Wi-Fi network. As such, in some embodiments, the wireless transmitter identifier 129 may comprise an identifier number for the Wi-Fi access point. In some cases, the wireless transmitter identifier 129 may comprise an identifier number for a Wi-Fi access point the mobile device 110 was connected to while constructing a request for location assistance or a location-based service. Embodiments are not limited to this example.

The location 127 may be received by the mobile device 120 in a number of different forms. In some cases it may be a precise geographic location, such as latitude-longitude pair or a street address. Alternatively it may be a geographic area, such as an estimated circle or oval representing the coverage area of a wireless transmitter. In some cases the location 127 may be an estimated location of the wireless transmitter identified by the wireless transmitter identifier. In some cases the received wireless transmitter identifier may be associated in the transmitter mapping with a plurality of possible locations, the location estimation component 160 operative to determine the location 127 as one of the possible locations prior to transmitting the location 127 as part of the response sent to the mobile device 120.

Figure 5:
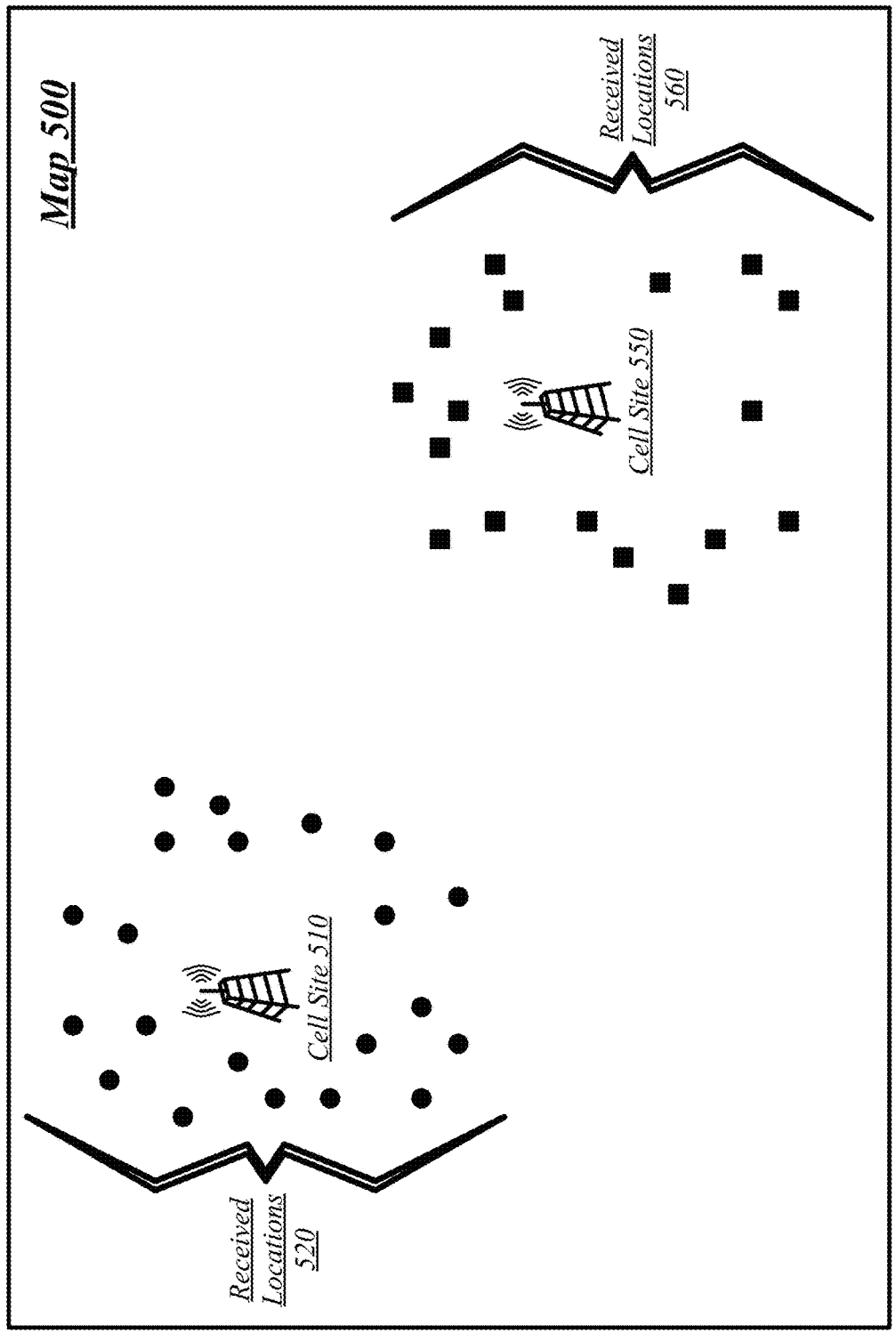
FIG. 5 illustrates a map for an example of constructing a transmitter mapping for the location system.

FIG. 5 illustrates an exemplary map 500 to illustrate construction of a transmitter mapping 135. In one embodiment, the transmitter mapping 135 may be generated and/or updated by the analysis component 150 of the location database generation component 130 of the location system 100, and stored in the location database 145.

A cell site 510 and a cell site 550 are depicted. In the depicted example the wireless transmitter identifiers—cell site IDs—for the cell site 510 and cell site 550 are distinct and unique. Also depicted are two groups of received locations: received locations 520 geographically proximate to cell site 510 and received locations 560 geographically proximate to cell site 550. Each of the locations within these groups may have been received individually from mobile devices 110, and are grouped by wireless transmitter identifier. Because the wireless transmitter identifiers for the cell sites are different and from each other, unique to the cell sites, and the corresponding locations are geographically proximate to each other in an area that could be covered by a cell site, there is no need to distinguish for a given location and wireless transmitter identifier pair which of a plurality of cell sites that pair should be associated with.

Figure 6:
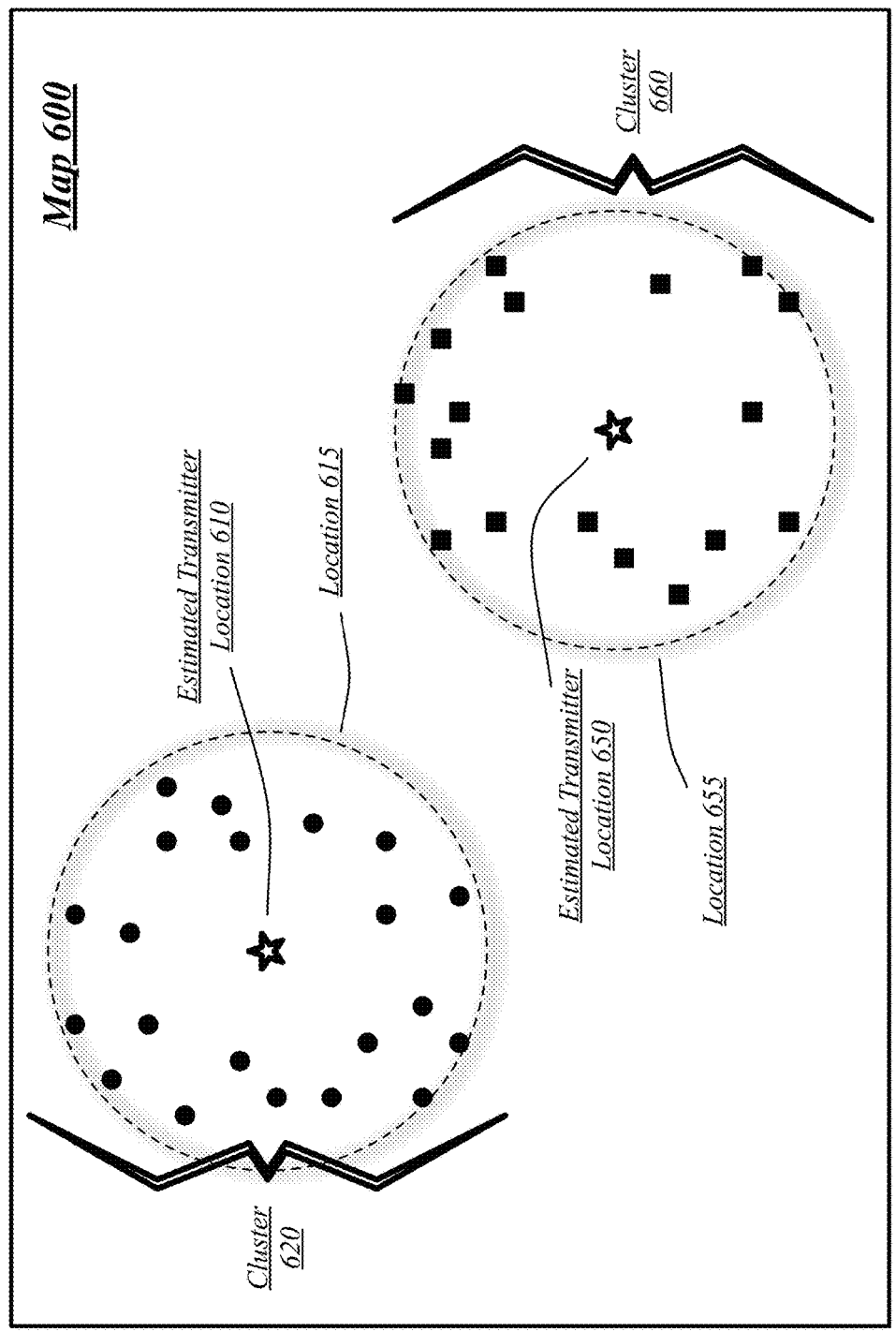
FIG. 6 illustrates a map for the continuation of the example of FIG. 5 of constructing a transmitter mapping for the location system.

FIG. 6 illustrates an exemplary map 600 to illustrate construction of a transmitter mapping 135. In one embodiment, the transmitter mapping 135 may be generated and/or updated by the analysis component 150 of the location database generation component 130 of the location system 100, and stored in the location database 145. As can be seen in the map 600 of FIG. 6, an estimated transmitter location 610 can be created in the center of received locations 520 such that a location 615 representing a broadcast area for cell site 510 includes all of the received locations 520. As such, received locations 520 can be joined together into a cluster 620 all associated with cell site 510, its estimated transmitter location 610, and the location 615 representing a coverage area.

Similarly, an estimated transmitter location 650 can be created in the center of received locations 560 such that a location 655 representing a broadcast area for cell site 550 includes all of the received locations 560. As such, received locations 520 can be joined together into a cluster 620 all associated with cell site 550, its estimated transmitter location 650, and the location 655 representing a coverage area.

In some embodiments it may be the estimated transmitter location 610 or 650 which is returned as the location in response to a request for location assistance using each associated cell site's corresponding cell site ID. In some embodiments it may be the coverage area location 615 or 655 which is returned as the location in response to a request for location assistance using each associated cell site's corresponding cell site ID.

In some embodiments, the analysis component 150 may be operative to: distribute the tuples of locations and wireless transmitter identifiers into clusters of tuples, each tuple of a cluster of tuples sharing a wireless transmitter identifier common to the cluster of tuples; determine an estimated transmitter location for each cluster of tuples as a center of locations of tuples assigned to each cluster of tuples; and construct the transmitter mapping from wireless transmitter identifiers to locations based on the estimated transmitter location of the clusters of tuples.

In order to distribute the tuples into clusters of tuples, the analysis component 150 may be operative to examine each tuple in turn and, for each tuple, if a cluster already exists with an associated wireless transmitter identifier the same as the wireless transmitter identifier of the tuple, assign the tuple to the cluster. Alternatively, if no cluster currently exists with an associated wireless transmitter identifier the same as the wireless transmitter identifier of the tuple, the analysis component 150 is operative to create a new cluster and associate the wireless transmitter identifier of the tuple with the new cluster. As such, each of the created clusters will have associated with it a single wireless transmitter identifier and every tuple with the associated wireless transmitter identifier will be assigned to the same cluster, so that each tuple of a cluster shares a wireless transmitter identifier common to the cluster.

The analysis component 150 is operative to determine an estimated transmitter location (e.g., 610 or 650) for each cluster based on the locations of the tuples assigned to the cluster. The estimated transmitter location may be calculated as a geographic center of locations of tuples assigned to the cluster. The geographic center may be calculated according to any one of a number of known methods for calculating a geographic center of a group of locations. In some embodiments, if the locations are represented a latitude-longitude pairs the estimated transmitter location may be calculated as being at the average latitude and average longitude across all of the locations of the tuples assigned to the cluster. Alternatively, in some embodiments, if the locations are represented as latitude-longitude pairs the estimated transmitter location may be calculated as being the center of minimum distance of all of the locations of the tuples assigned to the cluster.

Alternatively, the locations may be stored as or translated to x and y coordinates on a two-dimensional Cartesian plane. Generally, while the surface of the Earth is, of course, curved, for the distances that cellular and Wi-Fi signals travel the surface may be treated as flat without meaningfully degrading the accuracy of the estimated location. If x and y coordinates are used any one of a number of known methods for calculating a spatial center of a group of points in a two-dimensional plane may be used to calculate the estimated transmitter location. In some embodiments, the estimated transmitter location may be calculated as being at the average x-coordinate and average y-coordinate across all of the locations of the tuples assigned to the cluster. Alternatively, in some embodiments, the estimated transmitter location may be calculated as being the center of minimum distance of all of the locations of the tuples assigned to the cluster.

Alternatively, the locations may be stored as or translated to x, y, and z coordinates in a three-dimensional Cartesian space. The use of three-dimensional space may allow for a more accurate representation of geographic locations incorporating both the pseudo-spherical nature of the Earth and the local elevation. If x, y, and z coordinates are used any one of a number of known methods for calculating a spatial center of a group of points in a three-dimensional space may be used to calculate the estimated transmitter location. In some embodiments, the estimated transmitter location may be calculated as being at the average x-coordinate, average y-coordinate, and average z-coordinate across all of the locations of the tuples assigned to the cluster. Alternatively, in some embodiments, the estimated transmitter location may be calculated as being the center of minimum distance of all of the locations of the tuples assigned to the cluster.

It will be appreciated that while the broadcast area or transmission envelope of a transmitter may vary from a true circle or sphere because of intervening nature or artificial features, such variations may not necessarily impact this process for some implementations.

It will be further appreciated that distinct forms may be used for the storage of locations and calculation of the estimated location and that translation back and forth between two-dimensional Cartesian representations, three-dimensional Cartesian representations, latitude-longitude representations, and any other representation may be performed using the standard mathematical techniques for such translation.

Constructing the transmitter mapping 135 may comprise associating the estimated transmitter location for each cluster with the wireless transmitter identifier for that cluster such that the mapped location for each wireless transmitter identifier is the estimated transmitter location for that cluster. Alternatively, instead of the estimated transmitter location the mapped location may comprise the estimated coverage area corresponding to the estimated transmitter location. The estimated coverage area may comprise a circle centered on the estimated transmitter location with a radius equal to a predefined distance. The predefined distance may comprise an estimated coverage range for a wireless transmitter of a given type. For example, for a cell site, the predefined distance may be thirty kilometers. For a Wi-Fi access point the predefined distance may be one hundred meters.

The predefined distance may have been determined according to any one of a number of techniques. The predefined distance may generally represent an estimated coverage range for a wireless transmitter of a given type. The predefined distance may be based on, for example, theoretical calculations of a reasonable coverage area for a cell site. The predefined distance may be based on experimental analysis of the coverage areas of cell sites. The predefined distance may be based on experimental analysis of the clustering algorithm of the process described herein.

In some embodiments, the logging component 140 may be operative to receive a plurality of location data packages, the location data packages comprising locations and associated wireless transmitter identifiers, and to log the location data packages into a location database 145, the location database 145 comprising a plurality of tuples of the locations and the wireless transmitter identifiers. The logging component 140 may be operative to receive the plurality of location data packages as part of a preliminary data-gathering process to estimate the predefined distance for a wireless transmitter of a given type, such as for cell sites.

The analysis component 150 may be operative to determine the predefined distance according to the received plurality of location data packages. The analysis component 150 may be operative to perform clustering according to a plurality of experimental distances, such as a range of experimental distances. The analysis component 150 may be operative to evaluate a quality of the clustering according to a metric for evaluating clustering algorithms. For example, the analysis component 150 may be operative to calculate the Davies-Bouldin Index for the results of clustering for each experimental distance tested. The Davies-Bouldin Index may be calculated according to Equation 1 as follows.

$$DB = \frac{1}{n}\sum_{i=1}^{n} \max_{i \neq j} \frac{\sigma_i + \sigma_j}{d(c_i, c_j)} \qquad \text{Equation (1)}$$

In Equation (1), the variable "$c_i$" may refer to a specific cluster number with the index "i"; "$\sigma_i$" or sigma-sub-i may refer to the intra cluster distance for a cluster i, calculated as the average distance to center of all the tuples of the cluster; "$d(c_i, c_j)$" may refer to the inter cluster distance, calculated as the distance between the centers of clusters i and j; and "n" may refer to the number of clusters. The analysis component 150 may be operative to select as the predefined distance the tested experimental distance with the minimal Davies-Bouldin Index. In some embodiments, this may comprise using a predefined distance, such as thirty kilometers for cell sites, for example. The embodiments are not limited in this context.

Figure 7:
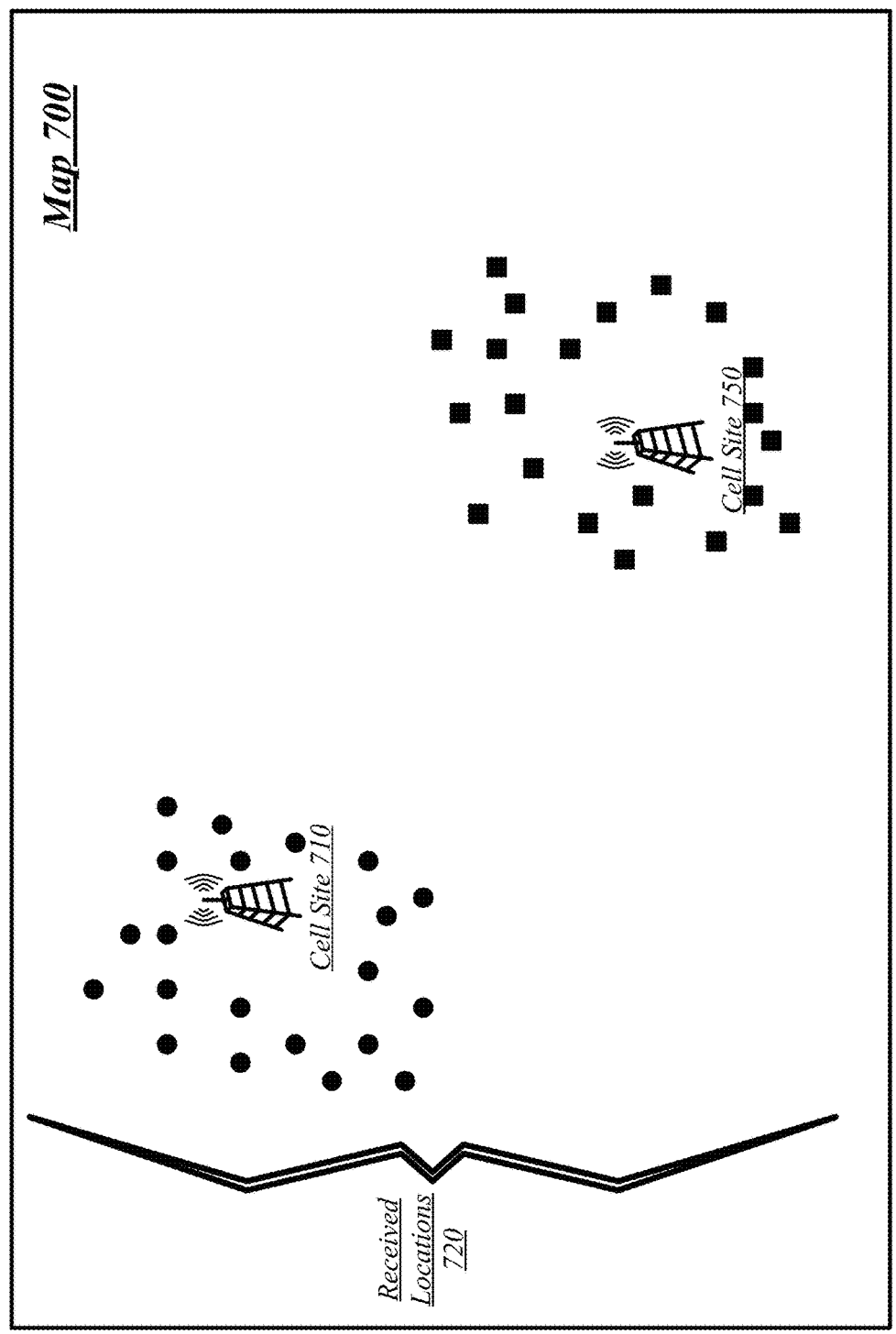
FIG. 7 illustrates a map for a second example of constructing a transmitter mapping for the location system.

FIG. 7 depicts an exemplary map 700 to illustrate the process of determining a plurality of locations and clusters where a plurality of wireless transmitters, depicted as cell sites, use the same wireless transmitter identifier, or cell site ID for the depicted example.

As shown in FIG. 7, received locations 720 all use the same cell site ID despite having been generated according to wireless transmissions received from two cell sites, shown as cell site 710 and cell site 750. As shown, the circular locations were derived from connections to cell site 710 and the square location was derived from cell site 750. In order to accurately estimate the coverage area of each of cell site 710 and 750 the location system 100 will divide the received locations 720 into two clusters, corresponding to the locations derived from the two cell sites 710 and 750.

The illustrated example depicts only two cell sites 710 and 750 with the same cell site ID. However, in some cases more than two cell sites might share the same cell site ID. In general, any number of cell sites may share the same cell site ID and the described process will distinguish them.

Figure 8:
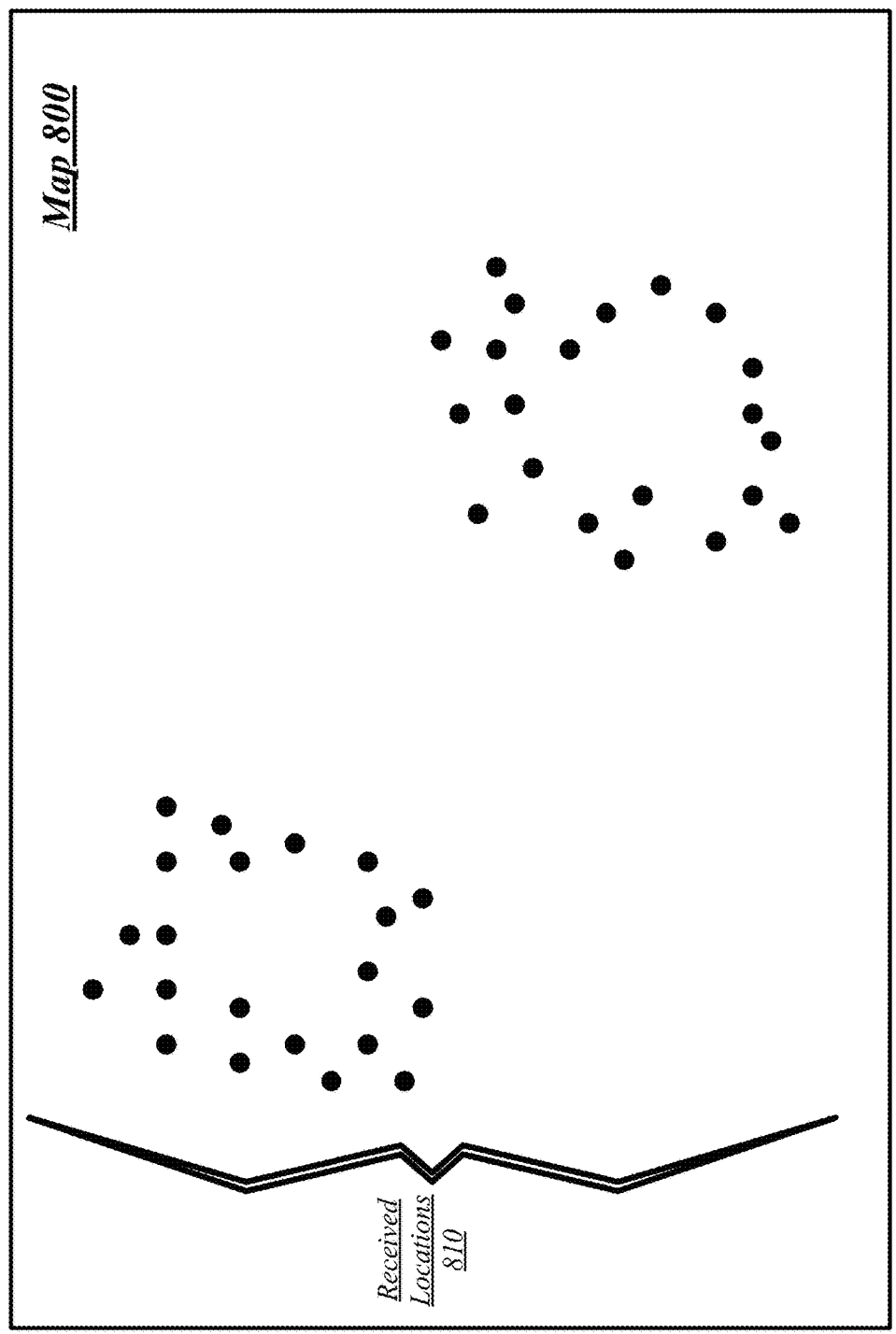
FIG. 8 illustrates a map for the continuation of the example of FIG. 7 of constructing a transmitter mapping for the location system.

FIG. 8 depicts as a continuation of the example of FIG. 7 an example map 800 showing the received locations 810 as a single group, where the location system 100 has not yet distinguished between those which should be associated with cell site 710 and which with cell site 750. Once this distinguishing is accomplished the estimating of the location and coverage area of each cell site can be performed.

Received locations 810 represent the accumulated knowledge of detections of associated locations and wireless transmitter identifiers, such as from a large number of mobile devices having requested location services while in the geographic areas covered by cell sites 710 and 750. Received locations 810 may comprise the entirety of locations received by the location system 100 or may comprise only the portion—for convenience of depiction in this example—of received locations with the shared cell site ID of cell site 710 and cell site 750. If received locations 810 are only a portion of the total received locations then prior to the analytic step represented by map 800 the total received locations will have been divided by cell site ID to produce received locations 810 with the shared cell site ID.

Figure 9:
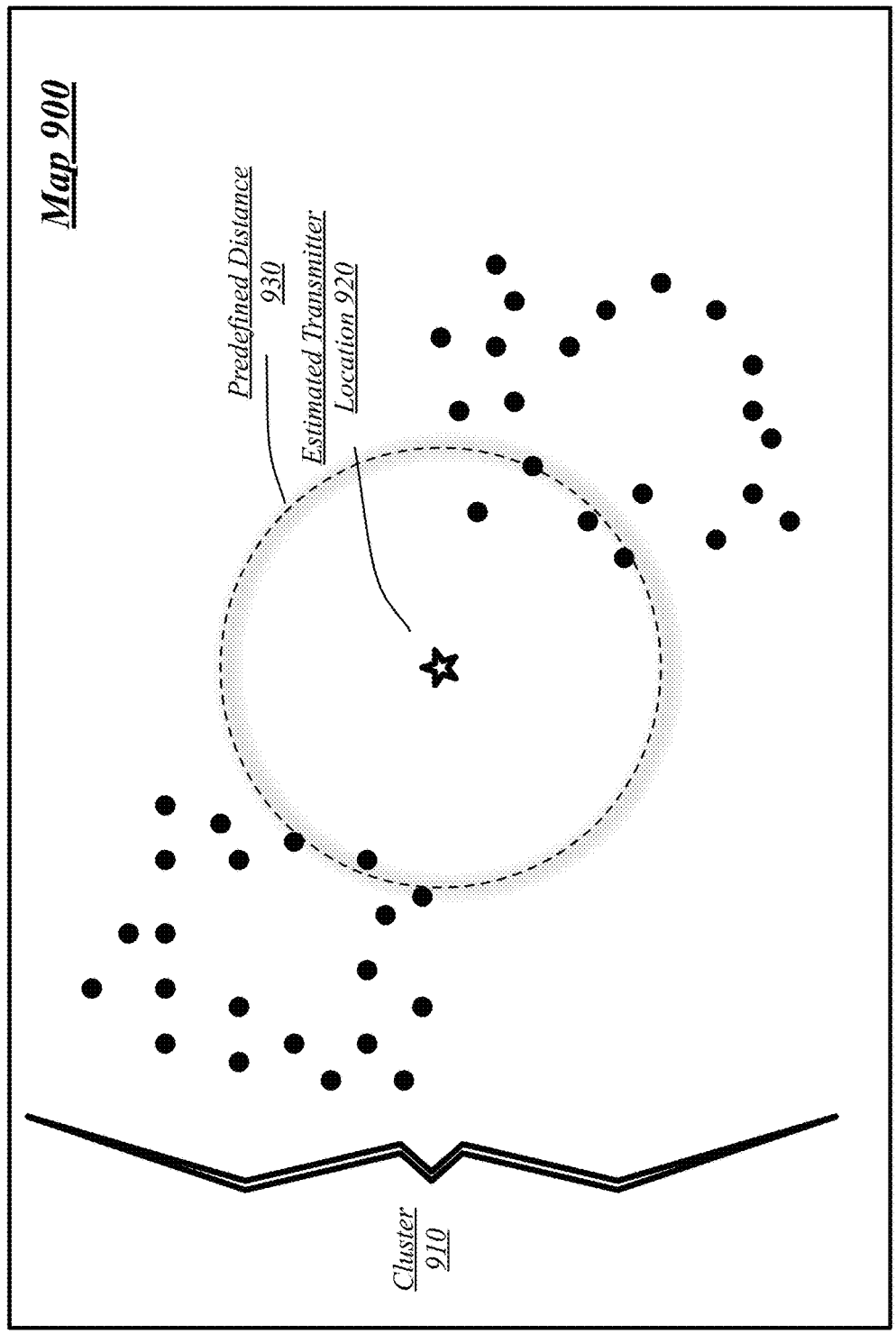
FIG. 9 illustrates a map for the continuation of the example of FIG. 7-8 of constructing a transmitter mapping for the location system.

FIG. 9 depicts as a continuation of the example of FIGS. 7 and 8 an example map 900 in which the received locations 810 have been joined together into a cluster 910 in a first stage of the analysis of analysis component 150. An estimated transmitter location 920 has been created for the cluster 910 and the coverage area at predefined distance 930 depicted.

As illustrated, the analysis component 150 was operative to create the cluster 910 through the distribution of tuples into clusters of tuples, each tuple of a cluster of tuples sharing a wireless transmitter identifier common to the cluster of tuples. The analysis component 150 was operative to determine the estimated transmitter location 920 for the cluster 910 as the center of locations of the tuples assigned to the cluster 910.

However, as shown, not all of the locations within the cluster fall within the predefined distance 930 of the estimated transmitter location 920. As the predefined distance 930 corresponds to an estimated maximum range of a cell site, the failure of all the locations to fall within the predefined distance 930 indicates that the cluster 910 has locations spread across too large an area to correspond to a single cell site. As such, the location system 100 must divide the locations into one or more distinct clusters associated with different cell sites.

Figure 10:
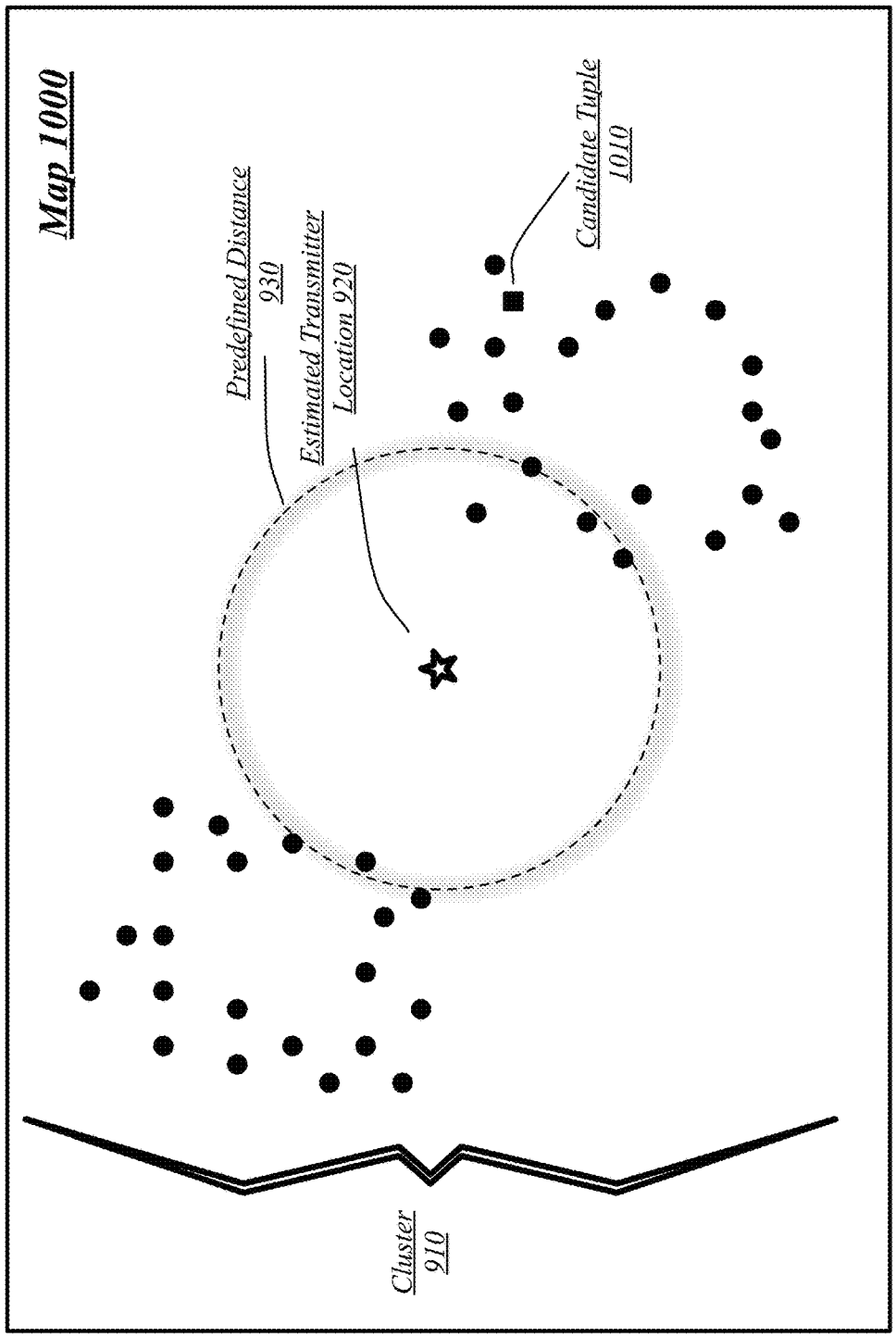
FIG. 10 illustrates a map for the continuation of the example of FIG. 7-9 of constructing a transmitter mapping for the location system.

FIG. 10 depicts as a continuation of the example of FIG. 7-9 an example map 1000. The analysis component 150 may be operative to create a new cluster in the clusters of tuples when a candidate tuple 1010 within a current cluster 910 falls outside a predefined distance 930 of the current cluster 910.

As shown the location of candidate tuple 1010 falls outside the predefined distance 930 of estimated transmitter location 920 and thus may be said to fall outside the predefined distance 930 of the cluster 910. While the specific candidate tuple 1010 was selected for the purpose of this example it will be appreciated that any of the tuples with locations outside the predefined distance 930 might have been selected. In some embodiments, the candidate tuple 1010 may be selected at random from those tuples outside the predefined distance 930. Candidate tuple 1010 will be used for the creation of a new cluster.

Figure 11:
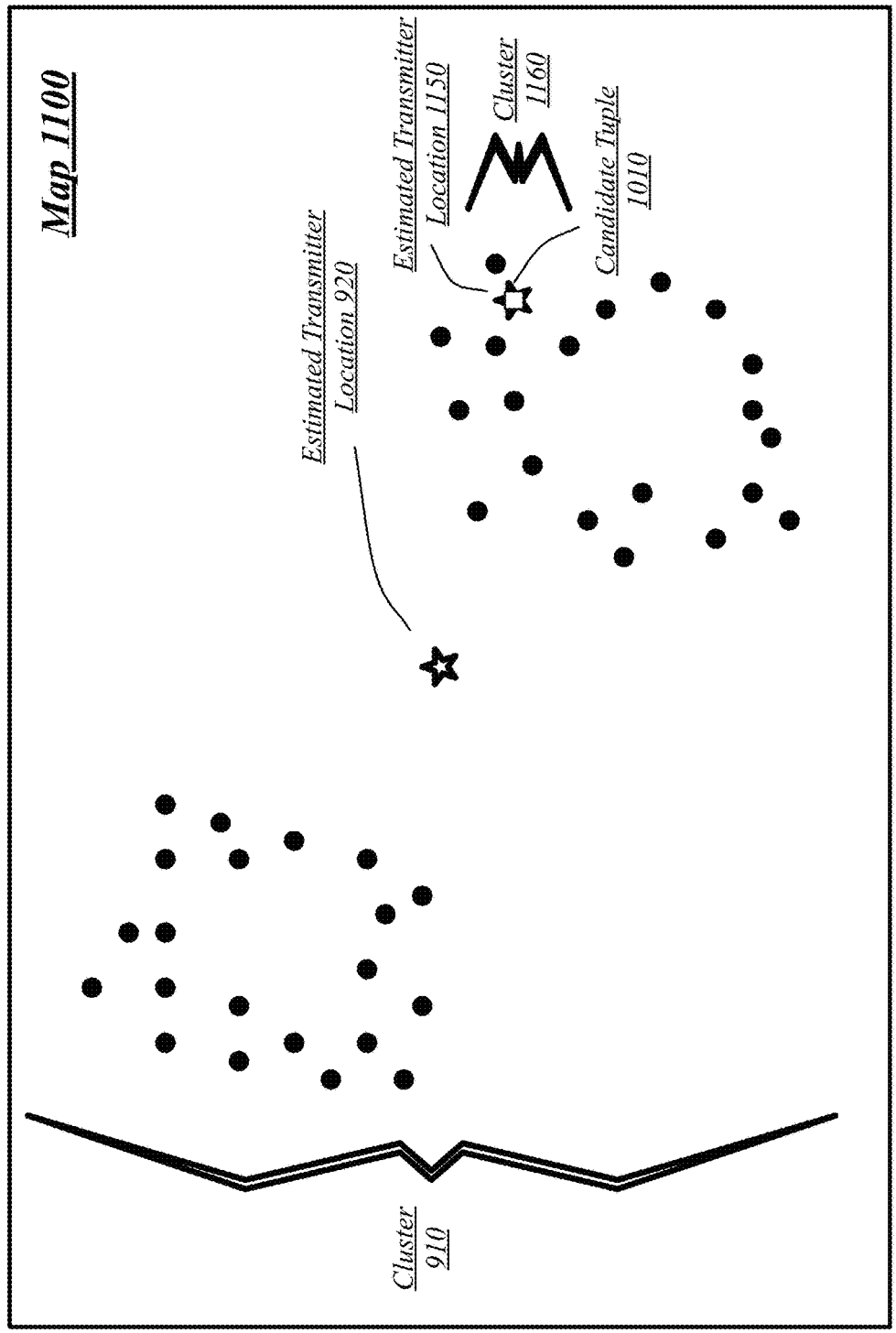
FIG. 11 illustrates a map for the continuation of the example of FIG. 7-10 of constructing a transmitter mapping for the location system.

FIG. 11 depicts as a continuation of the example of FIG. 7-10 an example map 1100. The analysis component 150 has created a new cluster 1160 in the clusters of tuples because the candidate tuple 1010 fell outside the predefined distance 930 of its previous cluster 910. The candidate tuple 1010 has been assigned to the new cluster 1160 and an estimated transmitter location 1150 has been determined for the new cluster 1160. Because the new cluster has only a single location, as depicted the estimated transmitter location 1150 is the same as the location of candidate tuple 1010. As such, in some embodiments, when a new cluster 1160 is created because a candidate tuple 1010 falls outside the predefined distance 930 of its previous cluster 910, the estimated transmitter location 1150 may automatically and directly set to be the location of the candidate tuple 1010. However, in general, any of the previously-discussed techniques for determining an estimated transmitter location may be used for a new cluster.

Figure 12:
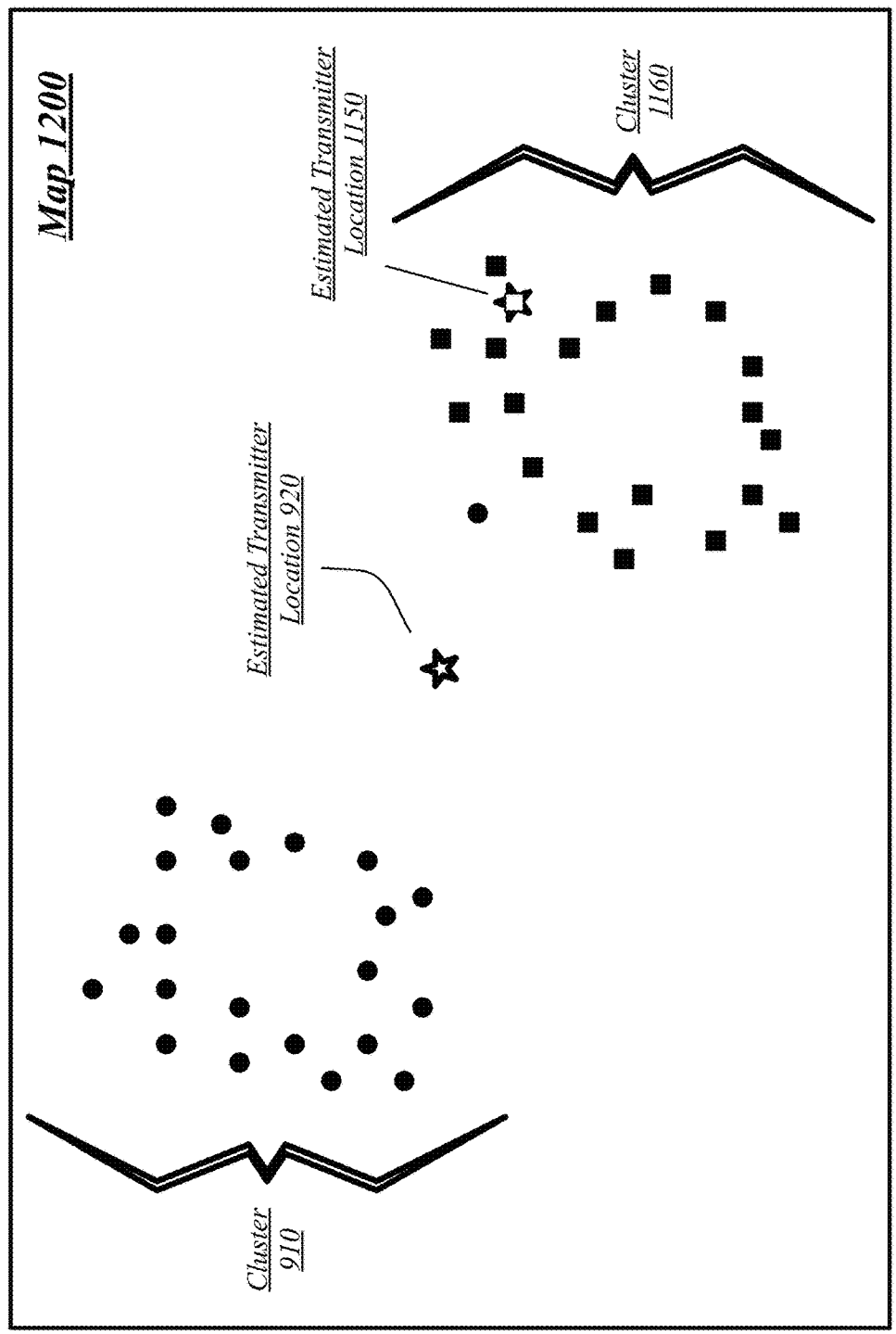
FIG. 12 illustrates a map for the continuation of the example of FIG. 7-11 of constructing a transmitter mapping for the location system.

FIG. 12 depicts as a continuation of the example of FIG. 7-11 an example map 1200. As depicted, the analysis component 150 has assigned shared-ID tuples with the same wireless transmitter identifier as the candidate tuple 1010 to the new cluster 1160 if the shared-ID tuples are closer to the estimated transmitter location 1150 for the new cluster 1160 than the current estimated transmitter location associated with each of the shared-ID tuples. "Shared-ID tuples," refers to all tuples with the same shared wireless transmitter identifier as the candidate tuple 1010, the term "shared-ID" being synonymous with having the same wireless transmitter identifier as the candidate tuple 1010. In the illustration of FIG. 12 the tuples depicted with square symbols have been assigned to cluster 1160 while the tuples depicted with circular symbols have remained assigned to cluster 910. As can be seen, the new cluster assignments better, but not perfectly, represent the division between cell sites.

Figure 13:
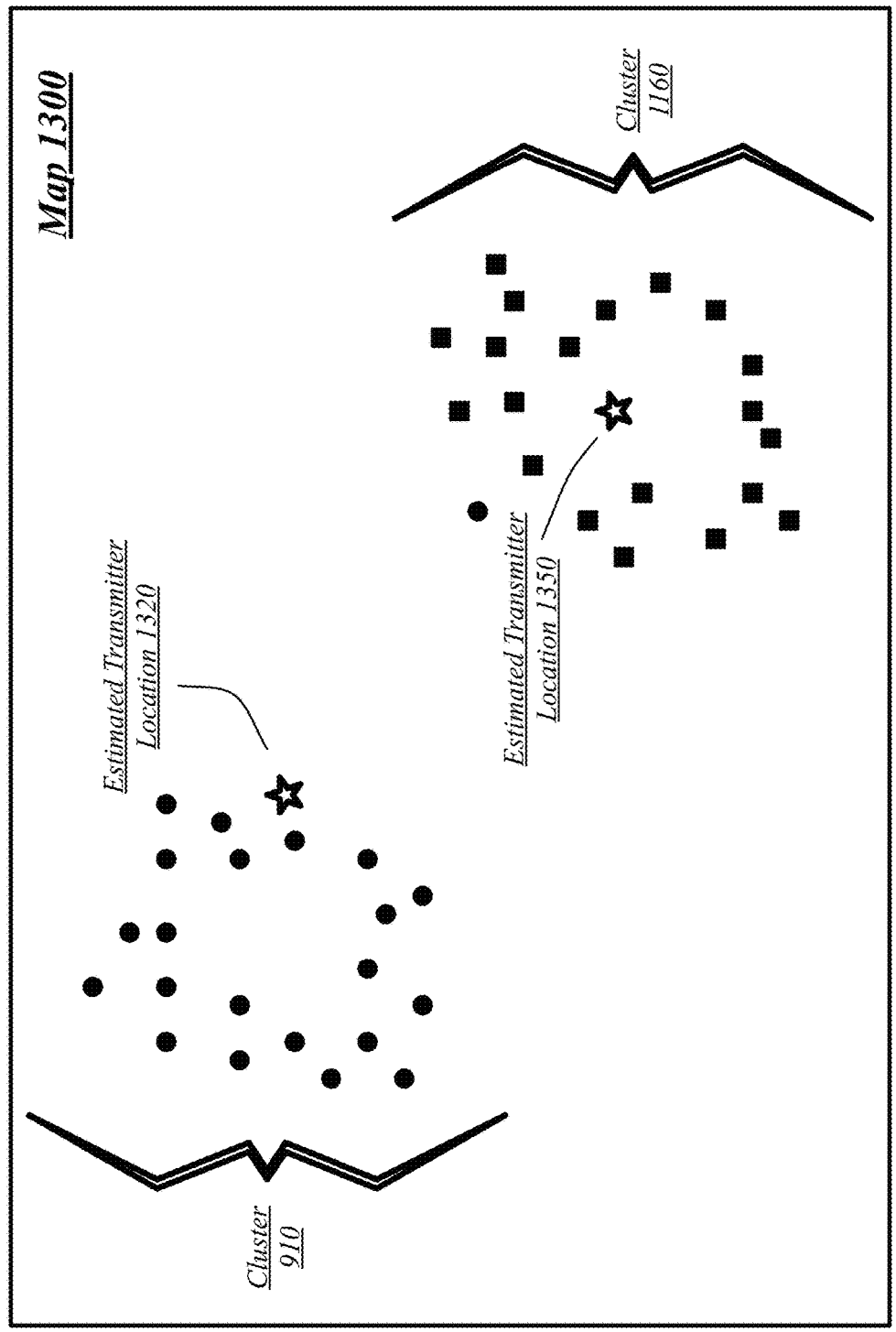
FIG. 13 illustrates a map for the continuation of the example of FIG. 7-12 of constructing a transmitter mapping for the location system.

FIG. 13 depicts as a continuation of the example of FIG. 7-12 an example map 1300. As illustrated, the analysis component 150 has determined a new estimated transmitter location 1320 for cluster 910 and a new estimated transmitter location 1350 for cluster 1160 based on the new assignment of tuples to clusters. The estimated transmitter location 1320 may have been determined according to any of the previously-discussed methods of estimating the location of a wireless transmitter. As can be seen the new estimated transmitter location 1350 is already a fairly good approximation of the location of cell site 750, while the new estimated transmitter location 1320, despite being closer to cell site 710, is still a poor estimate due to the outlier tuple near cluster 1160. This outlier will be moved in the next iteration of the procedure.

Figure 14:
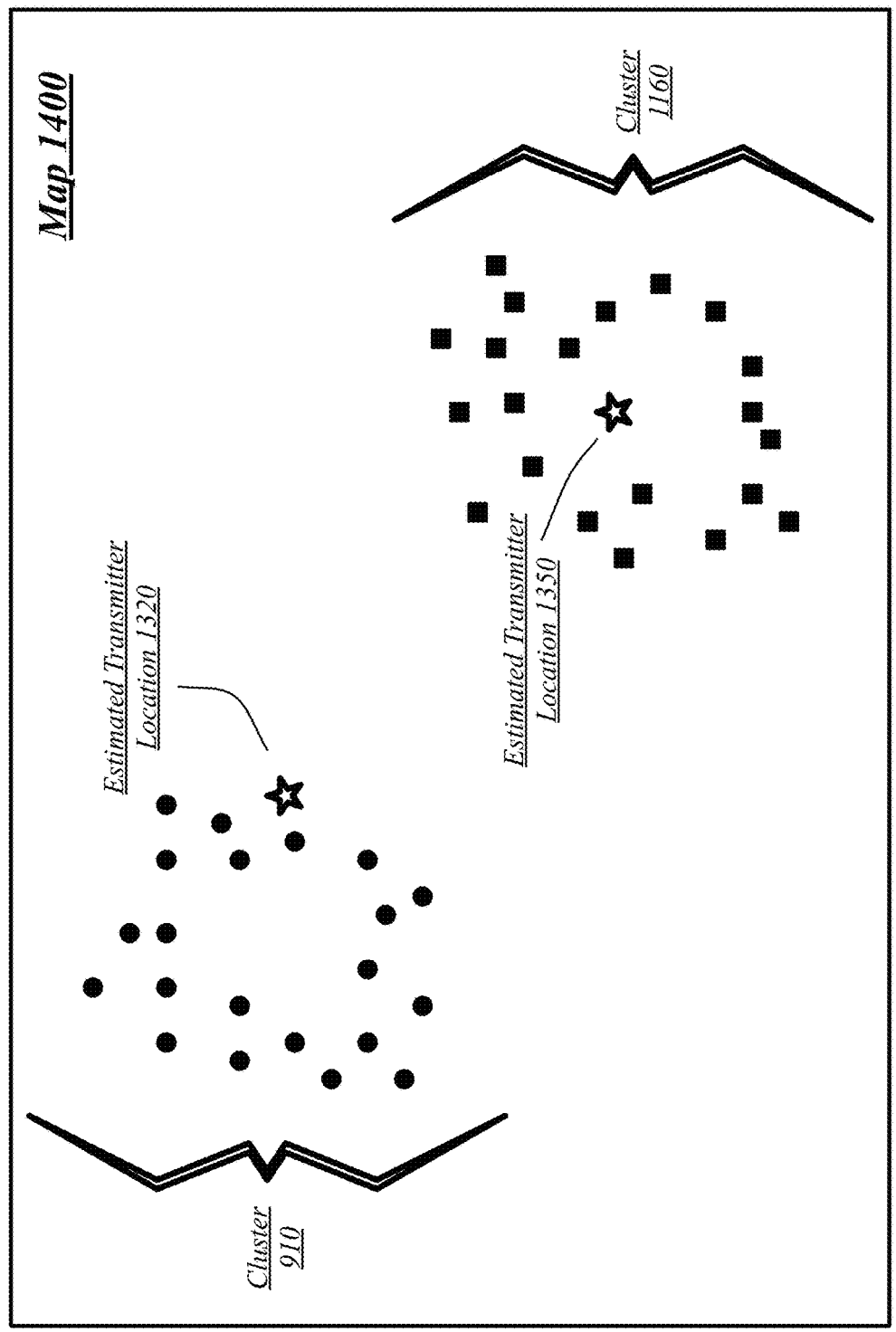
FIG. 14 illustrates a map for the continuation of the example of FIG. 7-13 of constructing a transmitter mapping for the location system.

FIG. 14 depicts as a continuation of the example of FIG. 7-13 an example map 1400. As illustrated, the analysis component 150 has again assigned shared-ID tuples to the cluster with the closest estimated transmitter location. In general, the analysis component 150 may be operative to repeatedly iterate through assigning tuples to a cluster with the closest estimated transmitter location and determining estimated transmitter locations until an iteration results in a stable assignment of tuples to clusters.

As illustrated, tuples were assigned to a cluster as a batch—every tuple considered to determine the closest estimated transmitter location—before new estimated transmitter locations were calculated. However, in some embodiments the estimated transmitter locations will be updated after each reassignment of a tuple from one cluster to another. It will be appreciated that this will typically converge to the same final set of clusters with the same final estimated transmitter locations if the coverage areas of the wireless transmitters don't overlap.

Figure 15:
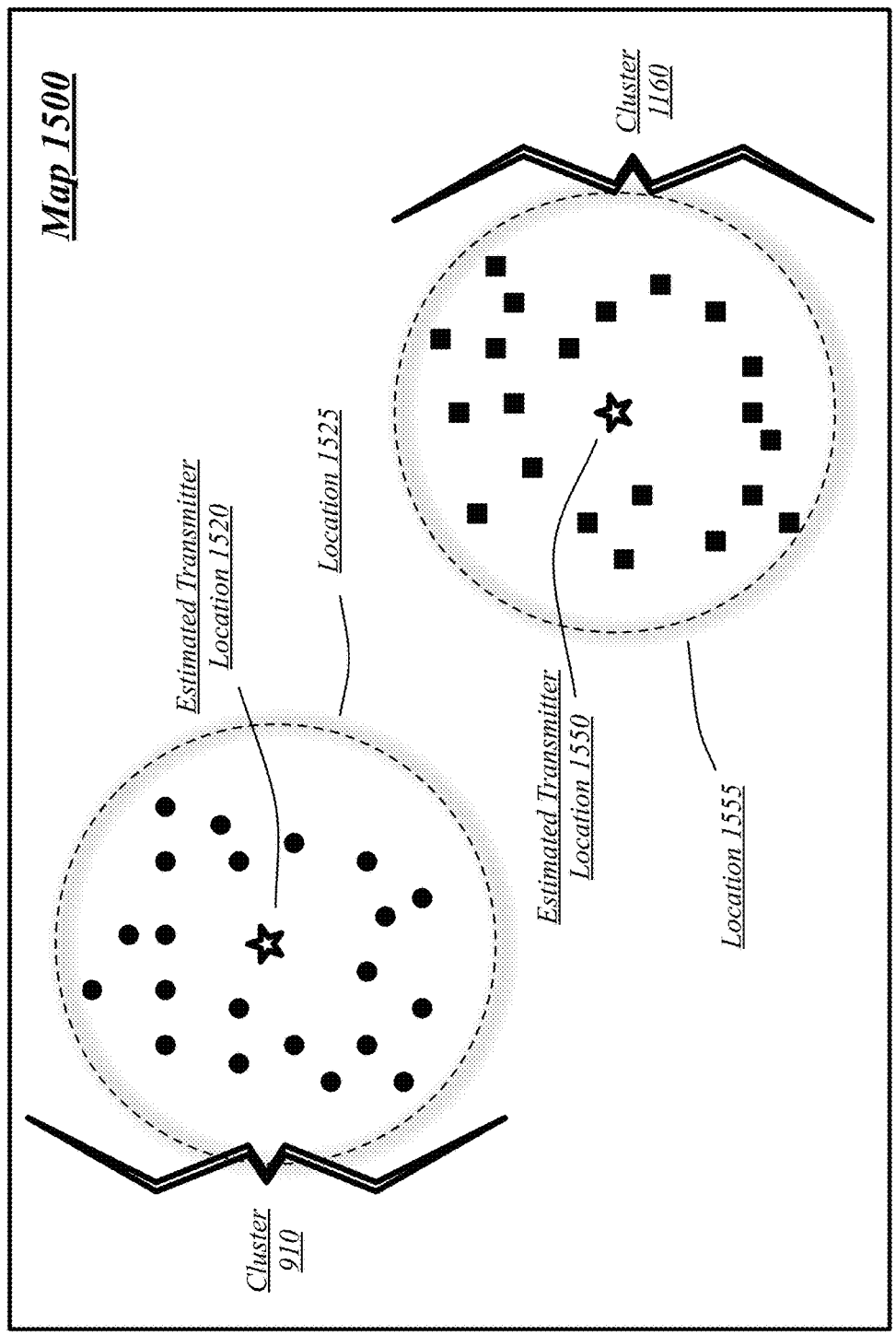
FIG. 15 illustrates a map for the continuation of the example of FIG. 7-14 of constructing a transmitter mapping for the location system.

FIG. 15 depicts as a continuation of the example of FIG. 7-14 an example map 1500. As illustrated, the analysis component 150 has determined a stable assignment of tuples to clusters according to the closest estimated transmitter location: cluster 910 with associated estimated transmitter location 1520 and cluster 1160 with associated estimated transmitter location 1550.

As illustrated, the location 1525 associated with estimated transmitter location 1520, representing an estimated coverage area for a cell site at estimated transmitter location 1520, contains all of cluster 910. Similarly, the location 1555 associated with estimated transmitter location 1550, representing an estimated coverage area for a cell site at estimated transmitter location 1555, contains all of cluster 1160. As such, no candidate tuples fall outside of the predefined distance of their existing cluster assignment and, as such, no new clusters need to be made. However, in general, the analysis component 150 may be operative to repeatedly iterate through creating clusters, assigning tuples to clusters, and determining estimated transmitter locations until an iteration results in a stable assignment of tuples to clusters. The analysis component 150 may be further operative to construct the transmitter mapping from wireless transmitter identifiers to locations constructed based on the resulting stable assignment of tuples to clusters.

As can be seen with comparison to map 700 of FIG. 7 the final, stable estimated transmitter locations 1520 and 1550 approximately but not perfectly correspond to the locations of cell sites 710 and 750. It will be appreciated that, in practice, such estimation will tend to be sufficient for common uses of location system 100. In particular, as the likely variation of the estimated transmitter locations from the actual cell site locations is going to be much smaller than the predetermined distance of the coverage area, any resulting imprecision in locating the center of the coverage area will be less significant than the imprecision of only knowing that the estimated location of a device is within the relatively larger area of the estimated coverage area.

As can be seen in FIG. 15 each cluster has an estimated transmitter location and a plurality of associated locations. An estimated coverage area may be calculated for each cluster based on the estimated transmitter location and the associated cluster of locations. For example, while the predefined distance may represent a reasonable maximum distance, in some cases it might be far larger than the actual distance over which a wireless transmitter will be used. As such, the locations may be filtered.

We may assume that the locations associated with a particular transmitter follow a multi-variate Gaussian distribution. With a Gaussian distribution, it can be calculated that a particular percentage of values produced by the distribution should fall within a particular deviation of the center or mean of the distribution. With a multi-variate Gaussian distribution this may be a tolerance region. For the two-dimensional problem, the smallest areas covering a particular percentage of the locations should be ellipses centered at the statistical center of the locations, which ellipses may be calculated based on the received locations. It may therefore be useful to filter the locations to be those that fall within the calculated ellipses. In different embodiments, different particular percentages may be used. For instances, in some embodiments, the particular percentage may be ninety percent, the ellipses created as minimal ellipses that cover ninety percent of the locations.

Figure 16A:
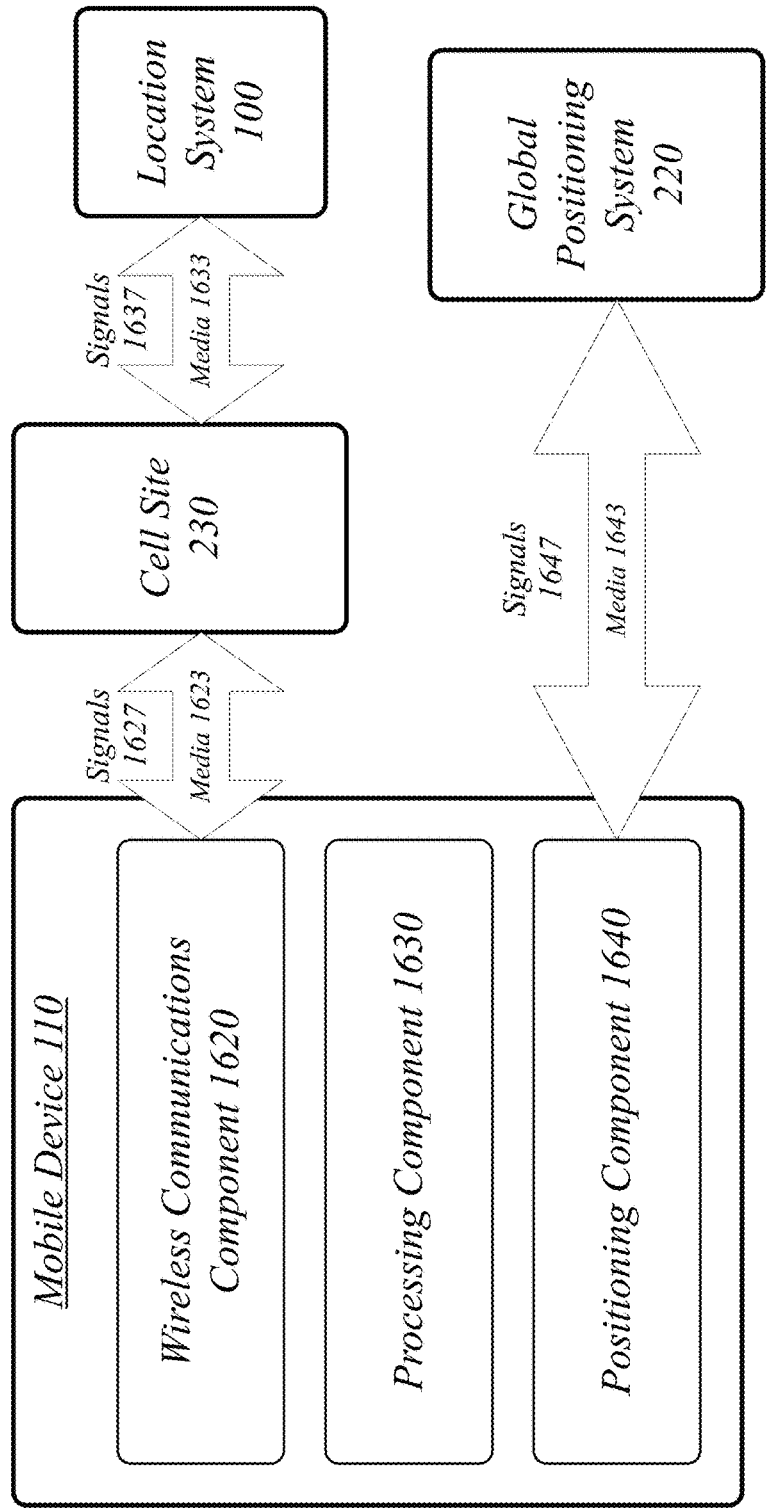
FIG. 16a illustrates a second operating environment for the location system involving logging information for a mobile device using a cell site and the global positioning system.

FIG. 16a illustrates an embodiment of an operating environment 1600 for the location system 100.

The mobile device 110 may comprise any mobile electronic device capable of receiving, processing, and sending information with the location system 100. Examples of a mobile electronic device may include without limitation an ultra-mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a laptop computer, a notebook computer, a netbook computer, a handheld computer, a tablet computer, a network appliance, a web appliance, a distributed computing system, multiprocessor systems, processor-based systems, consumer electronics, programmable consumer electronics, game devices, or mobile subscriber center. The embodiments are not limited in this context.

The mobile device 110 may execute processing operations or logic for its interaction with the location system 100 using a processing component 1630. The processing component 1630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The mobile device 110 may execute communications operations or logic for the system 100 using wireless communications component 1620. The wireless communications component 1620 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The wireless communications component 840 may include various types of standard communication elements, such as one or more communications interfaces, network interfaces, network interface cards (NIC), radios, wireless transmitters/receivers (transceivers), wireless communication media, physical connectors, and so forth. By way of example, and not limitation, wireless communications media 1623 may include any of the known methods of wireless communication including cellular networks, such as cellular telephone networks and cellular non-telephone networks, and non-cellular radio networks such as Wi-Fi.

Wireless communications component 1620 may be used to exchange signals 1627 with cell site 230 over media 1623. With reference to FIG. 1 and FIG. 2 signals 1627 may include the transmission from cell site 230 to mobile device 110 of wireless transmitter identifier 119. The transmission from cell site 230 to mobile device 110 of wireless transmitter identifier 119 may be automatic as part of the use of cell site 230 by mobile device 110. For example, the wireless transmitter identifier 119 may be included as part of a header of all communications between cell site 230 and mobile device 110. Further, signals 1627 may include the transmission of location data package 115 from the mobile device 110 to the location system 100 via cell site 230.

The cell site 230 may communicate with location system 100 using signals 1637 over media 1623 using any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The cell site 230 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1633 may include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. Signals 1637 sent over media 1633 may comprise the communication, transmission, or forwarding of location data package 115 received from the mobile device 110 to the location system 100.

The mobile device 110 may determine its location according to positioning component 1640. Positioning component 1640 may use any known technique for determining the location 117 of mobile device 110. Positioning component 1640 may comprise a hardware, a software, or a combined hardware/software module for the determination of the location 117 of mobile device 110. In the depicted embodiment, the positioning component 1640 comprises hardware and/or software for the reception of signals 1647 over media 1643 from the global positioning system 220. Global positioning system 220 may comprise a plurality of satellites providing location information broadcast as signals 1647 over radio frequencies which comprise media 1643. Signals 1647 may comprise signals received from one or more satellites comprising the global positioning system 220. In alternative embodiments, alternative location systems may be used such as the Russian GLObal NAvigation Satellite System (GLONASS), the European Union Galileo positioning system, the Chinese Compass navigation system, or Indian Regional Navigational Satellite System.

Figure 16B:
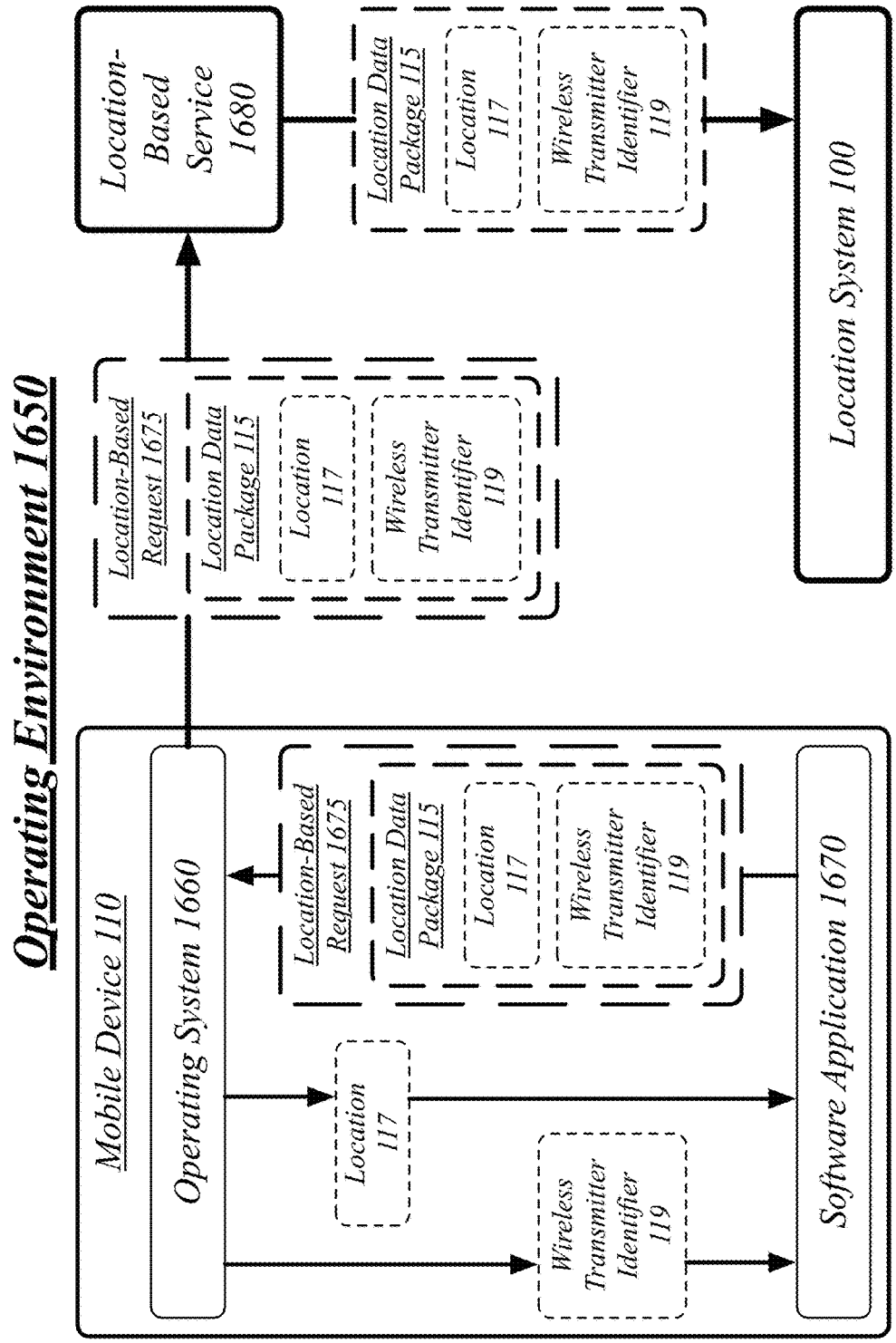
FIG. 16b illustrates a third operating environment for the location system in which the received information is received via an intermediary location-based service.

FIG. 16b illustrates an embodiment of an operating environment 1650 for the location system 100.

The mobile device 110 may comprise an operating system 1660. The operating system 1660 may comprise any software, software application, or library operative to provide functionality, hardware access, or any other service to a user or software application 1670, such as an operating system provided by the manufacturer of mobile device 110. For example, operating system 1160 may comprise Apple iOS®, Android®, Windows Mobile®, Windows Phone®, or any other known operating system. The operating system 1160 may be operative to provide functionality to applications such as software application 1670.

The functionality of operating system 1660 may include using positioning component 1640 to determine a location 117 and providing location 117 to the software application 1670. Such provisioning of location 117 may be in response to a request by software application 1670 for the location 117, such as through a procedure call to an operating-system-provided software library for determining location. The functionality of operating system 1660 may include using wireless communication component 1620 to perform wireless-network-based communications on behalf of software application 1670. Operating system 1660 may be operative to provide wireless transmitter identifier 119 to software application 1670 in response to a request from software application 1670 for a current-connected wireless transmitter. Operating system 1660 may be operative to receive a location-based request 1675 from software application 1675, such as through a library for network-based communication, and to transmit location-based request 1675 to location-based service 1680, such as by using wireless communications component 1620 transmitting cellular signals 1627 to cell site 230.

The mobile device 110 may comprise a software application 1670. The software application 1670 may comprise a first-party software application 1670, such as a software application 1670 provided by the manufacturer of the mobile device 110 or the operating system 1660. The software application 1670 may comprise a third-party software application 1670, such as a software application 1670 developed by a party other than the manufacturer of mobile device 110 or operating system 1660. A third-party software application 1670 may be installed by the manufacturer of the mobile device 110 or the operating system 1660, or may be installed by a user 210 of the mobile device 110. The software application 1670 may be generally operative to provide one or more functions and services to a user 210.

The software application 1670 may receive a request from a user 210 for a location-based task, such as a request for a map, a request to receive directions, a request for a location-based recommendation, a request to perform a location-based social networking task, or a request to perform any other location-based task. In response to the request from user 210, the software application 1670 may request the current location 117 of mobile device 110 from the operating system 1660 and receive the location 117 in response. The software application 1670 may further request an identifier for the currently-connected wireless transmitter from operating system 1660 and receive wireless transmitter identifier 119 in response. If the mobile device 110 is connected to more than one wireless transmitter then the software application 1670 may receive multiple wireless transmitter identifiers in response, which may be individually or collectively sent to location system 100. Alternatively, the software application 1670 may specifically request the wireless transmitter identifier 119 for a connected cell site 230, for a connected Wi-Fi access point 330, or for any other supported type of wireless transmitter.

The software application 1670 may prepare a location-based request 1675, the location-based request 1675 a network request for a location-based service 1680. The location-based request 1675 may comprise any sort of data sent by software application 170 to location-based service 1680 for the performance of location-based services. In addition, the location-based request 1675 may also comprise a location data package 115, including location 117 and wireless transmitter identifier 119, to be forwarded from location-based service 1680 to location system 100. The software application 1670 may transmit the location-based request 1675 to the operating system 1660 for transmission to the location-based service 1680.

The location-based service 1680 may comprise any sort of network-connected or Internet-connected service that uses a location as an input. Location-based service 1680 may comprise a mapping service, a location-based recommendation service, or a location-based social networking service. A location-based social networking service may, for example, use a location 117 to update the location of a user 210 on the social networking service to be location 117. In such cases, the location-based request 1675 may further comprise a status update for user 210 such that the social networking service would associate the location 117 and the status update with the user 210 on the social network. In general, the location-based request 1675 may comprise any additional data beyond location data package 115 sent by software application 1670 to location-based service 1680 for the performance of location based services.

As illustrated, the location data package 115 is a distinct element within location-based request 1675. It will be appreciated, however, that in some embodiments the location 117 may be included as part of location-based request 1675 outside of a distinct element of location data package 115. Further, rather than location data package 115 being included as a distinct element of location-based request 1675, software application 1670 may construct location-based request 1675, may incorporate location 117 as part of location-based request 1675 in order to further the requested service, and may then include wireless transmitter identifier 119 as an additional element of location-based request 1675 despite it not being for use by the location-based service 1680 (other than for forwarding to location system 100). In these embodiments, the depicted delineation of location data package 115 from location-based request 1675 may be interpreted as a symbolic distinction representing the logical inclusion of both elements due to their intended forwarding to location system 100. Alternatively, in some embodiments, location data package 115 may be included by software application 1670 as part of location-based request 1675 as a discrete unit for eventual forwarding by location-based service 1680 to location system 100.

The location-based service 1680 may receive the location-based request 1675 from mobile device 110. In response to receiving location-based request 1675, the location-based service 1680 may be operative to extract location data package 115 from the location-based request 1675 as well as any additional data for use in location-based services. The extraction of location data package 115 may comprise the extraction of location 117 and wireless transmitter identifier 119 from the location-based request 1675 and the formation of the location data package 115. The location-based service 1680 may then forward the location data package 115 to the location system 100 for eventual logging and analysis. The location-based service 1680 may further use the location 117 and any additional data received to perform location-based service and may transmit a response to the mobile device 110 and software application 1670 to the request for location-based services.

Figure 17:
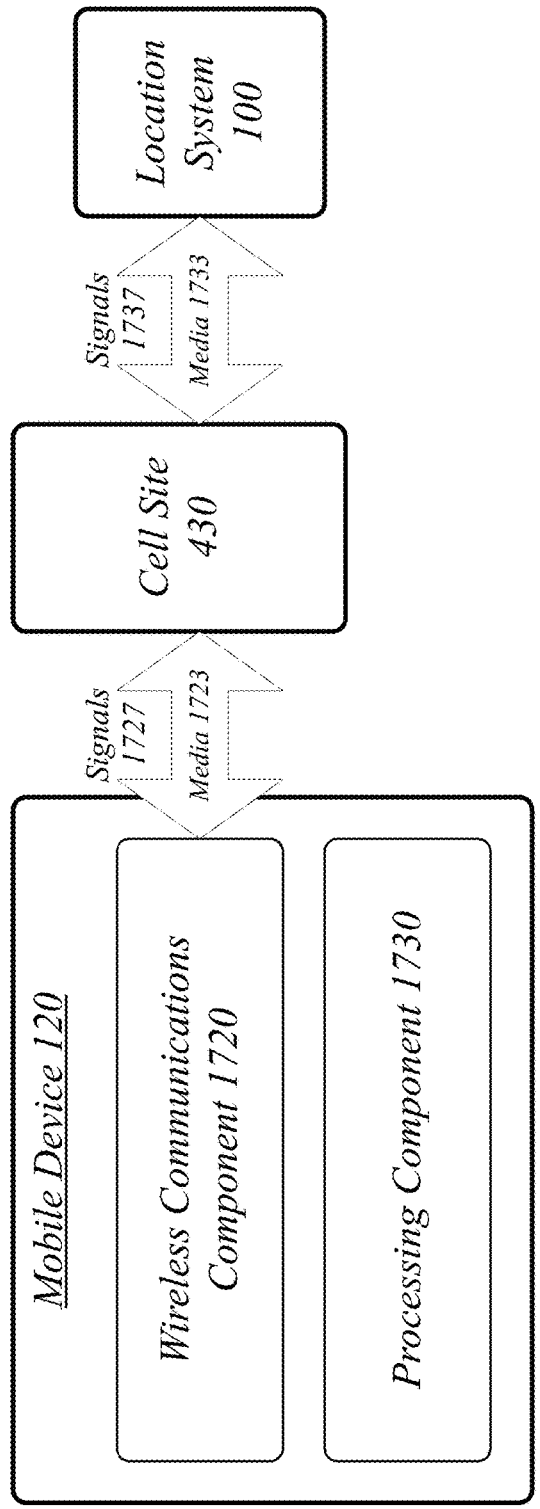
FIG. 17 illustrates a second operating environment for the location system involving determining a location for a mobile device using a cell site.

FIG. 17 illustrates an embodiment of an operating environment 1700 for the location system 100.

The mobile device 120 may comprise any mobile electronic device capable of receiving, processing, and sending information with the location system 100, such as any of the examples given for mobile 110 with reference to FIG. 16. The mobile device 120 may execute processing operations or logic for its interaction with the location system 100 using a processing component 1730. Processing component 1730 may comprise any of the examples given for processing component 1630 of mobile 110 with reference to FIG. 16. The mobile device 120 may execute communications operations or logic for the system 100 using wireless communications component 1720. Wireless communications component 1720 may comprise any of the examples given for wireless communications component 1620 of mobile 110 with reference to FIG. 16. Cell site 430 may be substantially similar to cell site 230 and signals 1727 sent over media 1723 may use any of the techniques listed for signals 1627 sent over media 1623 with reference to FIG. 16. Similarly, signals 1737 sent over media 1733 may use any of the techniques listed for signals 1637 sent over media 1633 with reference to FIG. 16.

Signals 1727 sent over media 1723 may comprise the transmission of wireless transmitter identifier 129 from the mobile device 120 to location system 100 with reference to FIG. 1 as part of a request for location assistance, and may comprise the reception of location 127 by mobile device 120 from location system 100 as a response to the request for location assistance. Signals 1737 sent over media 1733 may comprise the transmission or forwarding of wireless transmission identifier 129 from the cell site 430 to location system 100 and the reception of location 127 by the cell site 430 for transmission or forward to mobile device 120.

Figure 18:
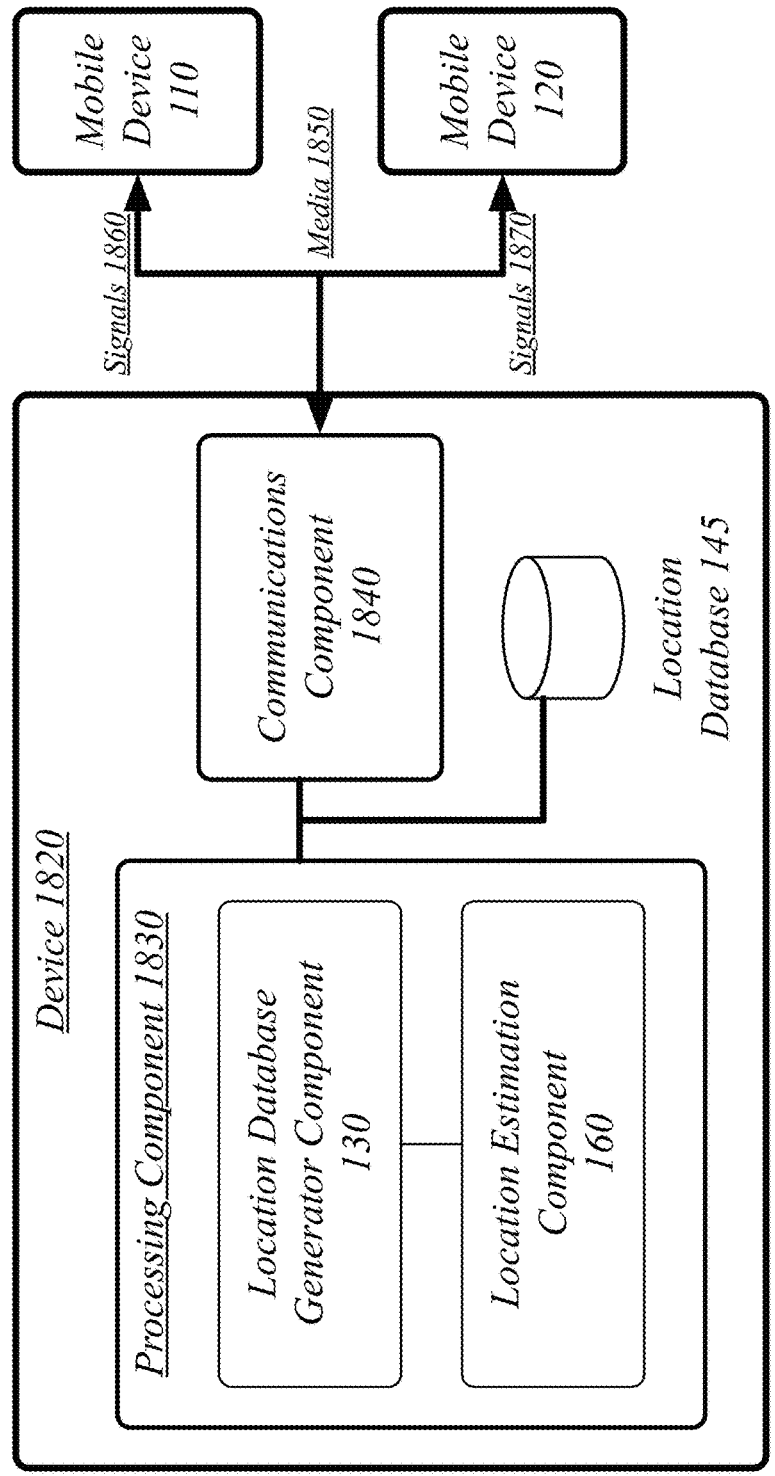
FIG. 18 illustrates an embodiment of a centralized system for the system of FIG. 1.

FIG. 18 illustrates a block diagram of a centralized system 1800. The centralized system 1800 may implement some or all of the structure and/or operations for the location system 100 in a single computing entity, such as entirely within a single device 1820.

The device 1820 may comprise any electronic device capable of receiving, processing, and sending information for the location system 100. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1820 may execute processing operations or logic for the system 100 using a processing component 1830. The processing component 1830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. The processing component 1830 may be operative to implement location database generator component 120 and location estimation component 160.

The device 1820 may execute communications operations or logic for the location system 100 using communications component 1840. The communications component 1840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1850 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1820 may communicate with the mobile devices 110, 120 over a communications media 1850 using communications signals 1860 and 1870 respectively, via the communications component 1840. Signals 1860 may comprise the interaction between the location system 100 and mobile device 110, such as the transmission of location data package 115 from the mobile device 110 to the location system 100. Signals 1870 may comprise the interaction between the location system 100 and the mobile device 120, such as the transmission of the request for location assistance comprising a wireless transmitter identifier 129 and the transmission of the response to the request comprising the location 127.

The location database 145 may comprise a database created and maintained according to any one of the known techniques for creating and maintaining a database. In general, the location database 145 may consist of any method of storing and retrieving tuples of associated locations and wireless transmitter identifiers, whether or not the tuples are stored in a product or library specifically titled as a database. Processing component 1830 may be operative to execute the interactions of the location database generator component 130 with the location database 145.

Figure 19:
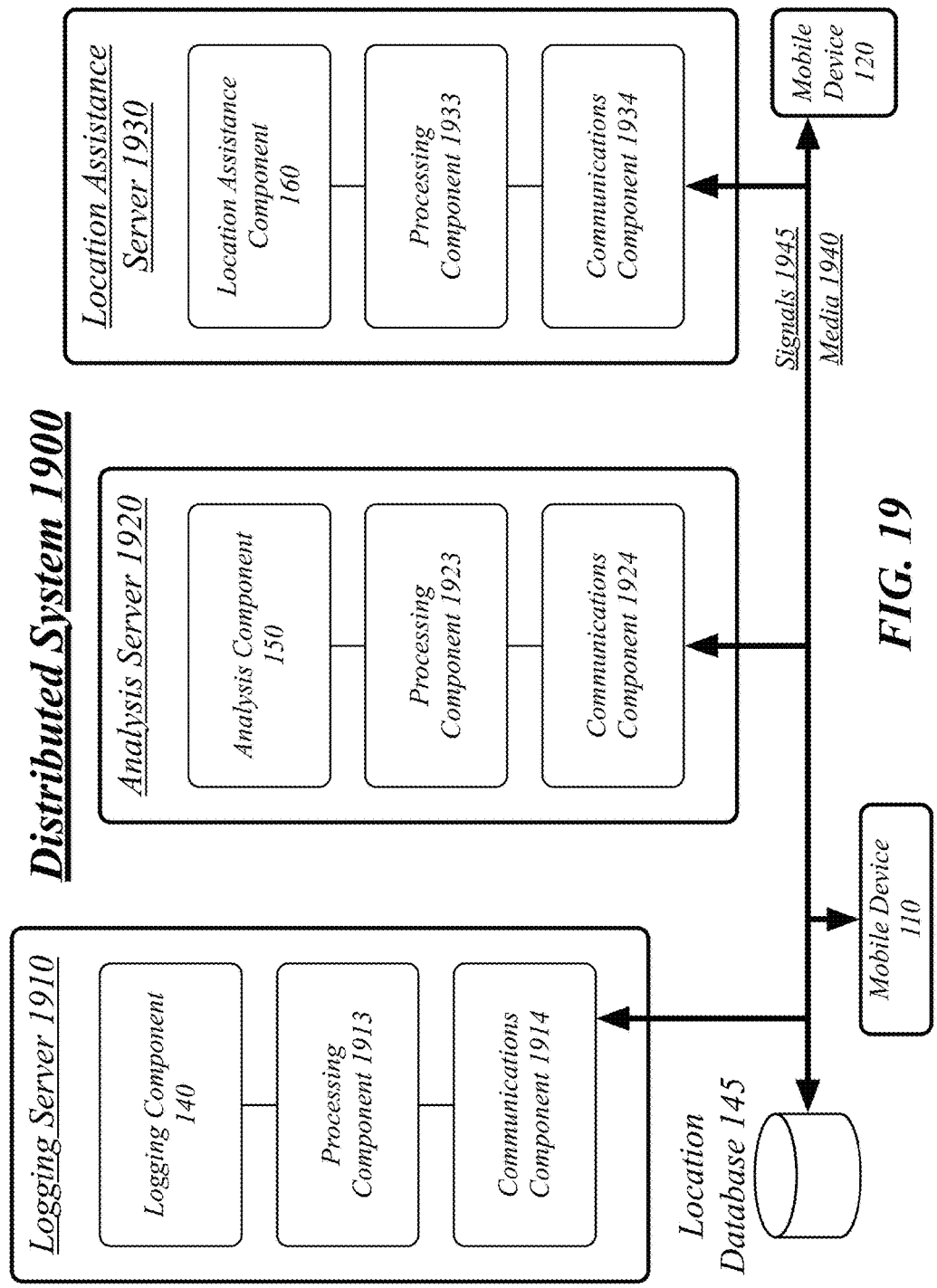
FIG. 19 illustrates an embodiment of a distributed system for the system of FIG. 1.

FIG. 19 illustrates a block diagram of a distributed system 1900. The distributed system 1900 may distribute portions of the structure and/or operations for the location system 100 across multiple computing entities. Examples of distributed system 1900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1900 may comprise a logging server 1910, an analysis server 1920, and a location assistance server 1930. In general, the logging server 1910, analysis server 1920, and location assistance server 1930 may be the same or similar to the device 1820 as described with reference to FIG. 18. For instance, each of the logging server 1910, analysis server 1920, and location assistance server 1930 may comprise a processing component 1913, 1923, and 1933 and a communications component 1914, 1924, and 1934 which are the same or similar to the processing component 1830 and the communications component 1840, respectively, as described with reference to FIG. 18. In another example, the servers 1910, 1920, and 1930 may communicate over a communications media 1940 using communications signals 1945 via the communications components 1914, 1924, and 1934. Said communication may include intercommunication between the servers 1910, 1920, and 1930, may include communication with mobile devices 110 and 120, and may include communication with a network-accessible location database 145.

The logging server 1910 may comprise or employ one or more client programs that operate to perform various methodologies in accordance with the described embodiments. In one embodiment, for example, the logging server 1910 may implement the logging component 140.

The analysis server 1920 may comprise or employ one or more client programs that operate to perform various methodologies in accordance with the described embodiments. In one embodiment, for example, the analysis server 1920 may implement the analysis component 150.

The location assistance server 1930 may comprise or employ one or more client programs that operate to perform various methodologies in accordance with the described embodiments. In one embodiment, for example, the location assistance server 1930 may implement the location assistance component 160.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 20 illustrates one embodiment of a logic flow 2000. The logic flow 2000 may be representative of some or all of the operations executed by one or more embodiments described herein.

In the illustrated embodiment shown in FIG. 20, at block 2002 the logic flow 2000 may receive a plurality of location data packages from a plurality of mobile devices, the location data packages comprising locations and wireless transmitter identifiers. One or more of the locations of the received plurality of location data packages may comprise global positioning system locations of the mobile devices. One or more of the wireless transmitter identifiers of the received plurality of location data packages may comprise identifier numbers for cell sites the mobile devices were connected to while determining one or more of the locations. One or more of the wireless transmitter identifiers of the received plurality of location data packages may comprise identifier numbers for Wi-Fi access points the mobile devices were connected to while determining one or more of the locations.

The location data packages may have been received as part of a larger communication effort and may be received indirectly from a location-based service 1680. For example, a user 210 might activate a software application 1670 on a mobile device 110 and request that the software application 1670 perform a task that leverages a location 117 of the mobile device 110: requesting directions, requesting localized recommendations, updating a social networking service as to the user's location or activity, or any other task. To achieve this, the mobile device 110 determines its location 117 using GPS while connected to a wireless transmitter such as cell site 230. The mobile device 100 then transmits the location 117 to a location-based service 1680 to perform the desired task. However, in order to aid the location system 100 the software application is operative to query the mobile device 100—such as an operating system of the mobile device 100—for the wireless transmitter 119 and then to include the wireless transmitter 119 in the transmission of the location 117 to location-based service 1680.

At block 2004 the logic flow 2000 may log the plurality of location data packages into a location database 145, the location database 145 comprising tuples of locations and wireless transmitter identifiers. For instance, the logging component 140 may log a plurality of location data packages 115 received from one or more mobile devices 110 into a location database 145. The location database 145 may comprise tuples of locations and wireless transmitter identifiers.

At block 2006 the logic flow 2000 may construct a transmitter mapping 135 from wireless transmitter identifiers to locations based on the location database 145. For example, the transmitter mapping 135 may be constructed by: distributing the tuples into clusters of tuples, each tuple of a cluster of tuples sharing a wireless transmitter identifier common to the cluster of tuples; determining an estimated transmitter location for each cluster of tuples as a center of locations of tuples assigned to each cluster of tuples; and constructing the transmitter mapping 135 from wireless transmitter identifiers to locations based on the estimated transmitter location of the clusters of tuples.

The analysis component 150 may store the transmitter mapping 135 in the location database 145. In general, the transmitter mapping 135 may be stored in the location database 145 for use by a location estimation component 160 in providing location assistance. Alternatively, the transmitter mapping 135 may be transmitted to a location estimation component 160 for use in providing location assistance.

Figure 21:
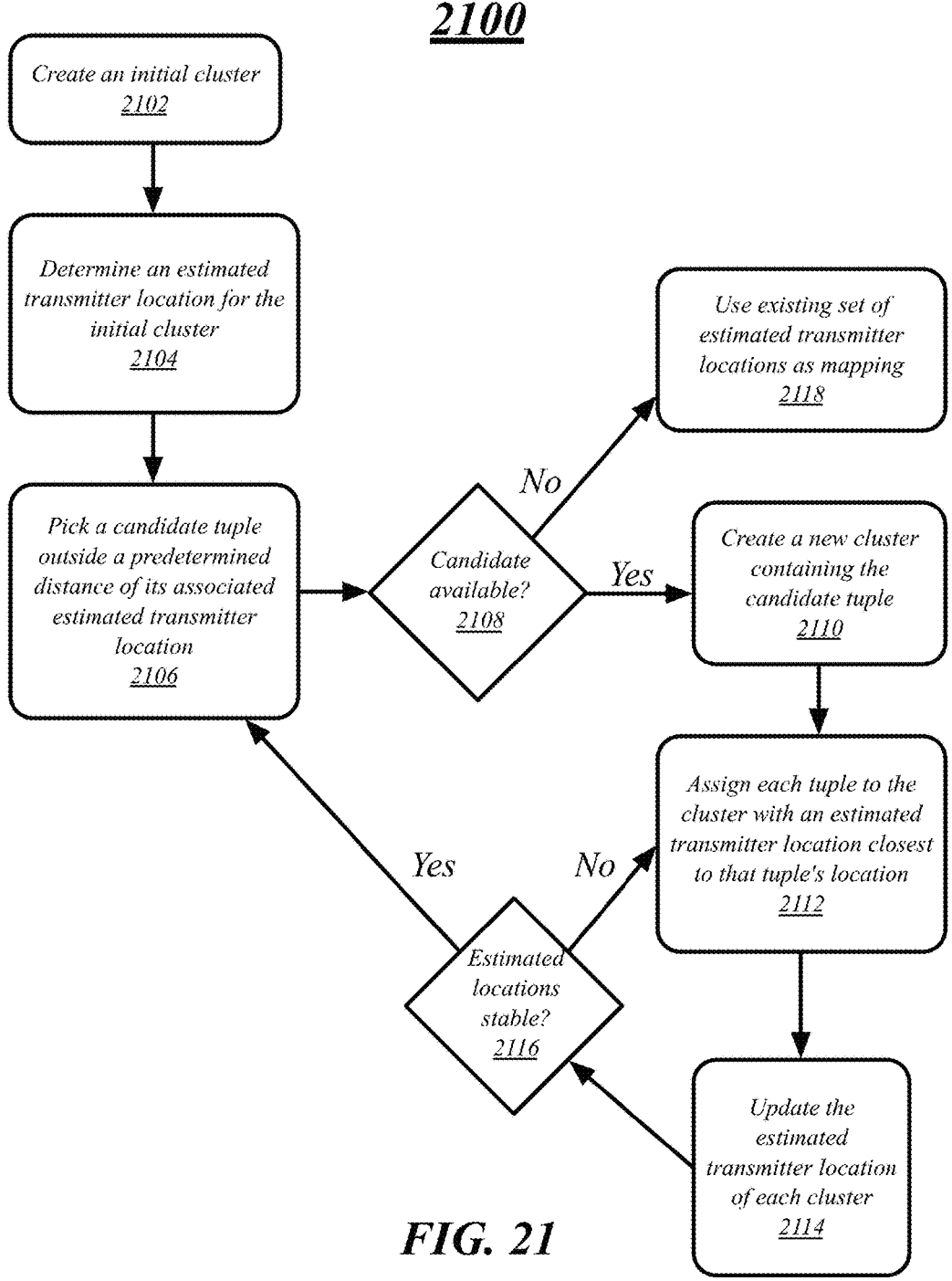
FIG. 21 illustrates a second logic flow for the location system of FIG. 1.

FIG. 21 illustrates one embodiment of a second logic flow 2100. The logic flow 2100 may be representative of some or all of the operations executed by one or more embodiments described herein. In some embodiments, the logic flow 2100 may represent operations executed for each cluster of tuples with a common wireless transmitter identifier.

At block 2102 the logic flow 2100 may create an initial cluster. The initial cluster may comprise every tuple with a given wireless transmitter identifier. In general, the step of creating an initial cluster may be performed many times, such as once for each unique wireless transmitter identifier.

Logic flow 2100 may then continue into block 2104.

At block 2104 the logic flow 2100 may determine an estimated transmitter location for the initial cluster. If the estimated transmitter location is a reasonable estimation of a wireless transmitter then all of the locations within the initial cluster will be located proximate to the estimated location. However, if some of the locations within the initial cluster fall outside an estimated coverage area for the estimated transmitter location then that may imply that the initial cluster contains locations generated from multiple wireless transmitters and will need to be divided into at least two clusters.

Logic flow 2100 may then continue into block 2106.

At block 2106 the logic flow 2100 may pick a candidate tuple outside a predetermined distance of its associated estimated transmitter location. The candidate tuple may be determined by iteratively comparing the location of each tuple to the location of the estimated transmitter location and determining whether the distance between the two is greater than that predetermined distance. The candidate tuple may then be the first tuple such compared wherein the distance between the two is greater than the predetermined distance.

Logic flow 2100 may then continue into block 2108.

At block 2108 the logic flow 2100 may determine whether a candidate tuple was available to be picked at block 2106. The lack of such a tuple implies that the existing assignment of tuples to clusters, and the existing estimated transmitter locations, is sufficient to provide coverage for all of the logged locations. The existence of such a tuple implies that additional clusters will be needed to represent multiple wireless transmitters.

If no, every tuple with the common wireless transmitter identifier is within the predetermined distance of its associated estimated transmitter location, and the logic flow 2100 may then continue into block 2118. If yes, the logic flow 2100 may continue into block 2110.

At block 2110 the logic flow 2100 may create a new cluster containing the candidate tuple. As part of this, the analysis component 150 may determine an estimated transmitter location for the new cluster at the location of the candidate tuple. As part of assigning the candidate tuple to the new cluster the candidate tuple will no longer be part of its previous cluster.

Logic flow 2100 may then continue into block 2112.

At block 2112 the logic flow 2100 may assign each tuple to the cluster with an estimated transmitter location closest to that tuple's location. This may serve to assign shared-ID tuples with a same wireless transmitter identifier as the candidate tuple to the new cluster if the shared-ID tuples are closer to the estimated transmitter location for the new cluster than a current estimated transmitter location associated with each of the shared-ID tuples.

Logic flow 2100 may then continue into block 2114.

At block 2114 logic flow 2100 may update the estimated transmitter location of each cluster. Updating the estimated transmitter location of each cluster may comprise determining, for each cluster, the center of locations of each tuple within the cluster. The analysis component 150 may be operative to update the estimated transmitter locations for only those clusters whose membership has changed.

Logic flow 2100 may then continue into block 2116

At block 2116 logic flow 2100 may determine whether the estimated locations are stable. If no, then further analysis is needed to determine whether any tuple needs to be assigned to a different cluster than its current one because of the new estimated locations, and the logic flow may loop back to block 2112. If yes the logic flow may then continue to block 2106. As such, the logic flow 2100 may iterate repeatedly through creating clusters, assigning tuples to clusters, and determining estimated transmitter locations until an iteration results in a stable assignment of tuples to clusters, with the stable assignment of tuples to clusters suitable for constructing the transmitter mapping from wireless transmitter identifiers to locations constructed.

At block 2118 the existing set of estimated transmitter locations may be used as the transmitter mapping 135. As such, the analysis component 150 may store the transmitter mapping 135 in the location database 145. The transmitter mapping 135 may be stored in the location database 145 for use by a location estimation component 160 in providing location assistance. Alternatively, the transmitter mapping 135 may be transmitted to a location estimation component 160 for use in providing location assistance.

After the activities of block 2118 the analysis of the received locations may conclude.

Figure 22:
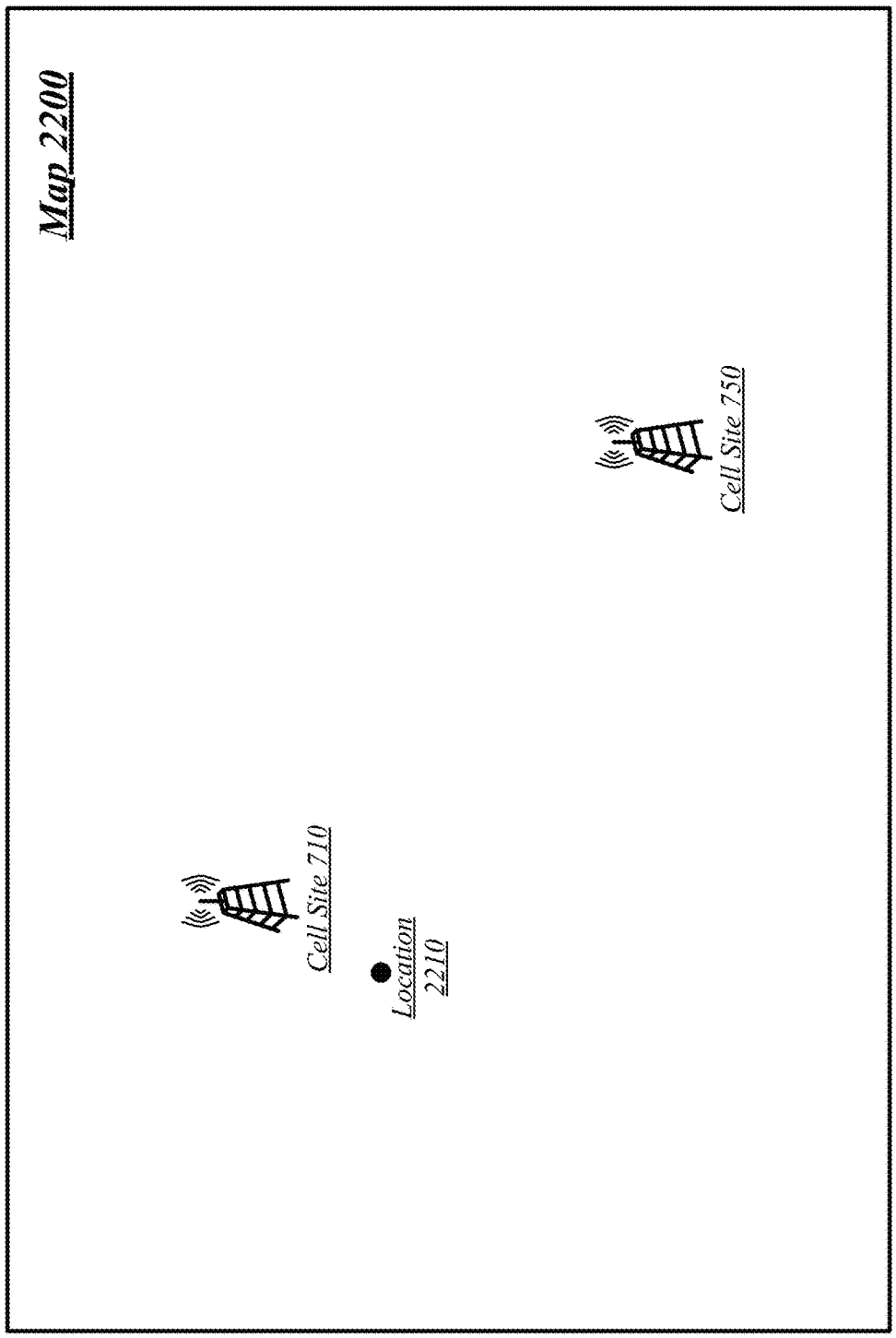
FIG. 22 illustrates an example of providing location services to a mobile device.

FIG. 22 illustrates an example map 2200 for the illustration of the process of providing location services to a mobile device 120. The location system 100 has received a request for location assistance from a mobile device 120 at location 2210, though the location system 100 does not itself know the location of location 2210. The received request for location assistance comprises a wireless transmitter identifier 129 which matches both cell site 710 and cell site 750.

FIG. 23 illustrates a transmitter mapping 2300 that may have produced by location system 100 for use in providing location services by location system 100. As illustrated the transmitter mapping 2300 comprises a plurality of wireless transmitter identifiers 2310 comprising identifiers 2311-2315. As further illustrated the transmitter mapping 2300 also comprises a plurality of wireless transmitter locations 2320 comprising locations 2321-2325.

As can be seen, identifier 2313, which has identifier number 08254-856, has two associated locations: location 2323a and location 2323b. With reference to FIG. 22, location 2323a may correspond to the estimated transmitter location of cell site 710 and location 2323b may correspond to the estimated transmitter location of cell site 750. As both locations match the received wireless transmitter identifier 129 the location system 100 cannot determine, based only on wireless transmitter identifier 129, which of location 2323a and location 2323*b* should be returned to mobile device 120 as a response to its request for location assistance.

In this situation in which the received wireless transmitter identifier 129 is associated in the transmitter mapping 135 with a plurality of possible locations, the location estimation component 160 may be operative to determine the location 127 as one of the possible locations.

Figure 24:
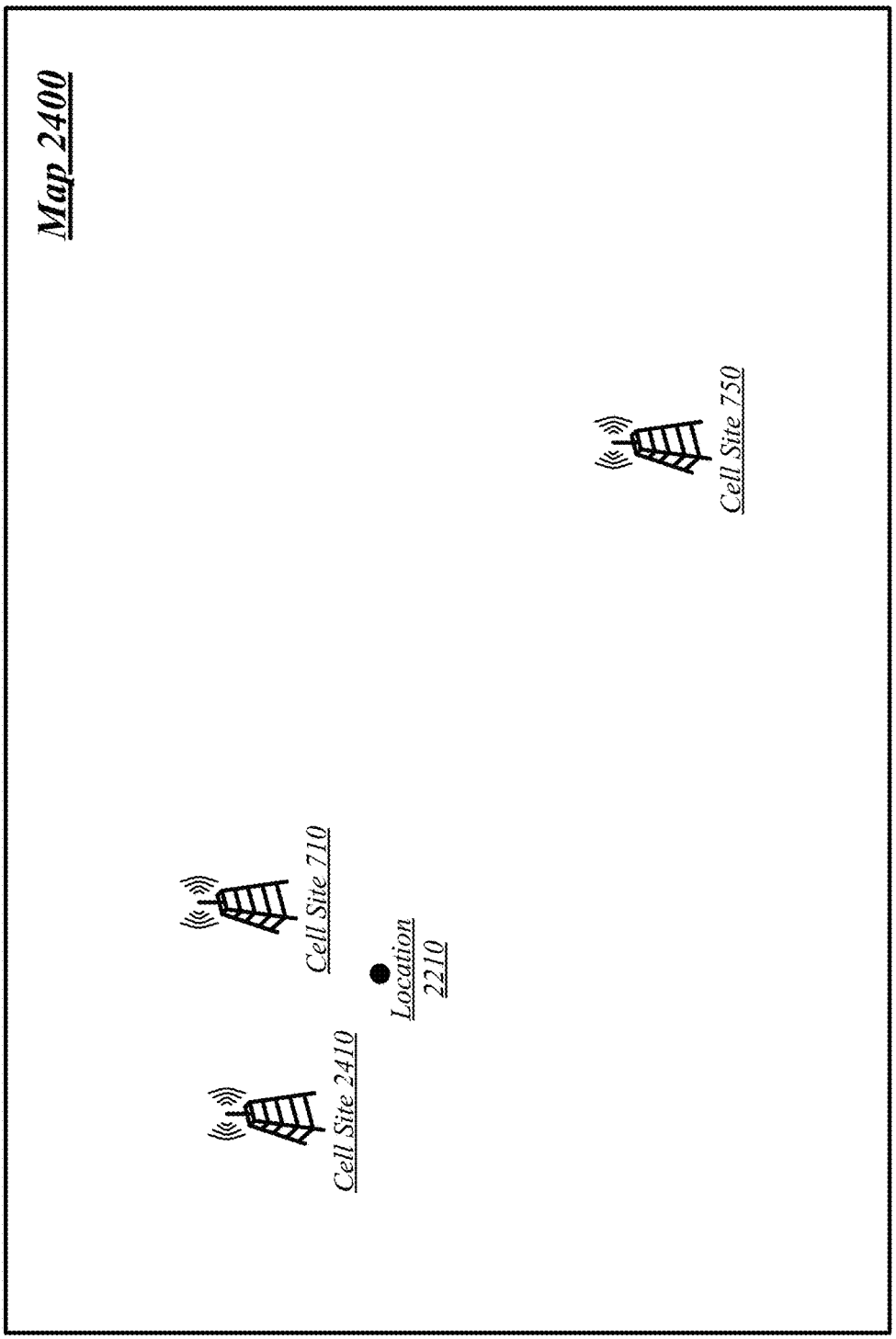
FIG. 24 illustrates a map as the continuation of the example of FIG. 22-23 of providing location services to a mobile device.

FIG. 24 illustrates an example map 2400 in the continuation of the example of FIG. 22 and FIG. 23. The location system 100 may be operative to determine another cell site 2410 believed to be in the vicinity of mobile device 120 which sent the location assistance request. If the location of cell site 2410 can be determined to be, as illustrated, closer to cell site 710 then to cell site 750 then it may be concluded that cell site 710 is more likely to be the cell site that mobile device 120 is connected to. For example, with reference to FIG. 23, cell site may have wireless transmitter identifier 2314 with associated location 2324 that is significantly closer to location 2323*a* (corresponding to cell site 710) then to location 2323*b* (corresponding to cell site 750). Determining which location of a plurality of locations is closest to a reference location may comprise any of the known methods for determining distances between locations, and may be based on latitude-longitude distance, distance in a Cartesian plane, distance in a Cartesian space, or any other known method.

As such, in some embodiments, the received request for location assistance may comprise a second wireless transmitter identifier 2314, the location estimation component 160 operative to determine a second location 2324 for the second wireless transmitter identifier 2314 and to determine the location 127 as the location 2323*a* of the plurality of possible locations closest to the second location 2324. The second wireless transmitter identifier 2314 may comprise an identifier for a second wireless transmitter in range of the mobile device 120 at the time of constructing the request for location assistance, or may comprise a wireless transmitter identifier 2314 logged at a previous time, such as the wireless transmitter identifier detected most recently prior to the wireless transmitter identifier 129.

Alternatively, in some embodiments, the location estimation component 160 may be operative to: log a previous request received from the mobile device 120 prior to the reception of the request, the previous request comprising a second wireless transmitter identifier 2314; determine a second location 2324 for the second wireless transmitter identifier 2314; and determine the location 127 as the location 2323*a* of the plurality of possible locations closest to the second location 2324. The previous request may comprise the most recent request received from the mobile device 120 or may comprise the most recent request received from the mobile device 120 which contained a wireless transmitter identifier.

It will be appreciated that while in the illustrated example both identifiers are from cell sites, that the identifiers may be for any of the supported types of wireless transmitters and may not both be from the same type of wireless transmitter. For example, the first wireless transmitter identifier 129 may identify a cell site while the second wireless transmitter identifier 2314 may identify a Wi-Fi access point, or any other possible combination.

Figure 25:
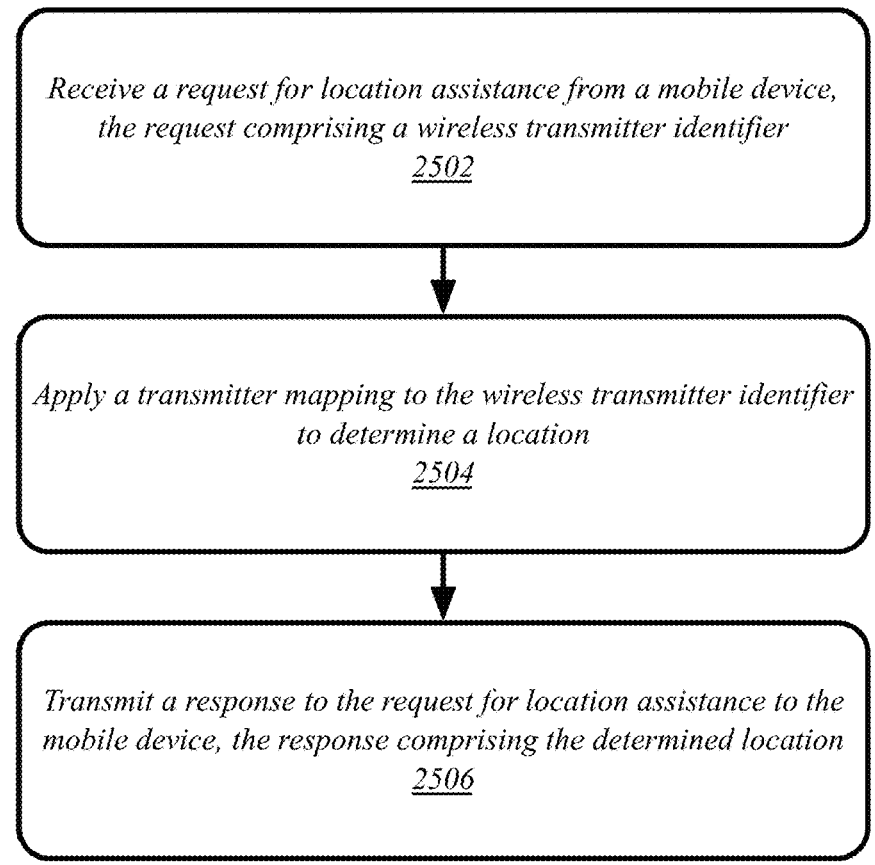
FIG. 25 illustrates a third logic flow for the location system of FIG. 1.

FIG. 25 illustrates one embodiment of a third logic flow 2500. The logic flow 2500 may be representative of some or all of the operations executed by one or more embodiments described herein.

At block 2502 the logic flow 2500 may receive a request for location assistance from a mobile device 120, the request comprising a wireless transmitter identifier 129. The wireless transmitter identifier 129 may comprise an identifier number for a cell site 430 the mobile device 120 was connected to while constructing the request for location assistance. Alternatively or additionally, the wireless transmitter identifier 129 may comprise an identifier number for a Wi-Fi access point the mobile device was connected to while constructing the request for location assistance. In some cases, the received request may comprise a second wireless transmitter identifier 2314. In some cases, the second wireless transmitter identifier 2314 may have been received as part of a previous request received from the mobile device 120 prior to the reception of this request.

At block 2504 the logic flow 2500 may apply a transmitter mapping 135 to the wireless transmitter identifier 129 to determine a location 127. The location 127 may comprise an estimated location of a wireless transmitter identified by the wireless transmitter identifier 129. As previously discussed, the received wireless transmitter identifier may be associated in the transmitter mapping 135 with a plurality of possible locations, in which case the logic flow 2500 may determine the location as one of the possible locations. If the received request comprised a second wireless transmitter identifier 2314, then a second location 2324 for the second wireless transmitter identifier 2314 may be determined, with the location 127 determined as the location 2323*a* of the plurality of possible locations closest to the second location 2324. If a previous request was received from the mobile device 120 and logged with wireless transmitter identifier 2314, then a second location 2324 for the second wireless transmitter identifier 2314 may be determined, with the location 127 determined as the location 2323*a* of the plurality of possible locations closest to the second location 2324. The transmitter mapping 135 may have been constructed from the distributed collection of locations and wireless transmitter identifiers by a plurality of mobile devices.

At block 2506 the logic flow 2500 may transmit a response to the request for location assistance to the mobile device 120, the response comprising the determined location 127.

In some embodiments, the determined location 127 may include an estimated coverage area for the wireless transmitter. The estimated coverage area may comprise, for example, an ellipse representing an estimated coverage area according to the received plurality of location data packages.

Figure 26:
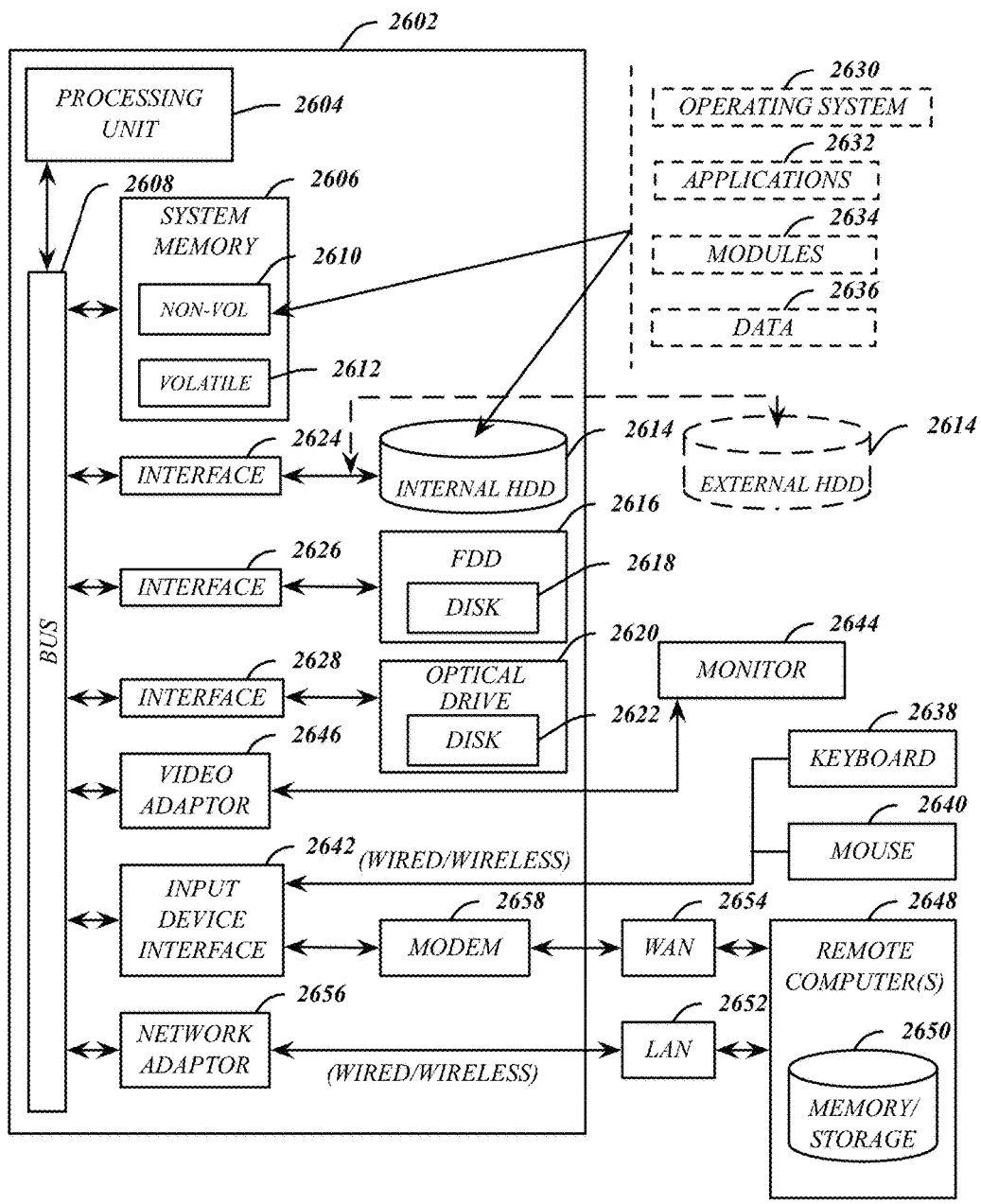
FIG. 26 illustrates an embodiment of a computing architecture.

FIG. 26 illustrates an embodiment of an exemplary computing architecture 2600 suitable for implementing various embodiments as previously described. In one embodiment, the computing architecture 2600 may comprise or be implemented as part of an electronic device. Examples of an electronic device may include those described with reference to FIGS. 16, 17, 18, and 19, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 2600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 2600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 2600.

As shown in FIG. 26, the computing architecture 2600 comprises a processing unit 2604, a system memory 2606 and a system bus 2608. The processing unit 2604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 2604.

The system bus 2608 provides an interface for system components including, but not limited to, the system memory 2606 to the processing unit 2604. The system bus 2608 can be any of several types of bus structure that may further interconnect to a memory bus (with or without a memory controller), a peripheral bus, and a local bus using any of a variety of commercially available bus architectures. Interface adapters may connect to the system bus 2608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 2600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 2606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 26, the system memory 2606 can include non-volatile memory 2610 and/or volatile memory 2612. A basic input/output system (BIOS) can be stored in the non-volatile memory 2610.

The computer 2602 may include various types of computer-readable storage media in the form of one or more lower speed memory units, including an internal (or external) hard disk drive (HDD) 2614, a magnetic floppy disk drive (FDD) 2616 to read from or write to a removable magnetic disk 2618, and an optical disk drive 2620 to read from or write to a removable optical disk 2622 (e.g., a CD-ROM or DVD). The HDD 2614, FDD 2616 and optical disk drive 2620 can be connected to the system bus 2608 by a HDD interface 2624, an FDD interface 2626 and an optical drive interface 2628, respectively. The HDD interface 2624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 2610, 2612, including an operating system 2630, one or more application programs 2632, other program modules 2634, and program data 2636. In one embodiment, the one or more application programs 2632, other program modules 2634, and program data 2636 can include, for example, the various applications and/or components of the location system 100.

A user can enter commands and information into the computer 2602 through one or more wire/wireless input devices, for example, a keyboard 2638 and a pointing device, such as a mouse 2640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 2604 through an input device interface 2642 that is coupled to the system bus 2608, but can be connected by other interfaces such as a parallel port, IEEE 1394 serial port, a game port, a USB port, an IR interface, and so forth.

A monitor 2644 or other type of display device is also connected to the system bus 2608 via an interface, such as a video adaptor 2646. The monitor 2644 may be internal or external to the computer 2602. In addition to the monitor 2644, a computer typically includes other peripheral output devices, such as speakers, printers, and so forth.

The computer 2602 may operate in a networked environment using logical connections via wire and/or wireless communications to one or more remote computers, such as a remote computer 2648. The remote computer 2648 can be a workstation, a server computer, a router, a personal computer, portable computer, microprocessor-based entertainment appliance, a peer device or other common network node, and typically includes many or all of the elements described relative to the computer 2602, although, for purposes of brevity, only a memory/storage device 2650 is illustrated. The logical connections depicted include wire/wireless connectivity to a local area network (LAN) 2652 and/or larger networks, for example, a wide area network (WAN) 2654. Such LAN and WAN networking environments are commonplace in offices and companies, and facilitate enterprise-wide computer networks, such as intranets, all of which may connect to a global communications network, for example, the Internet.

When used in a LAN networking environment, the computer 2602 is connected to the LAN 2652 through a wire and/or wireless communication network interface or adaptor 2656. The adaptor 2656 can facilitate wire and/or wireless communications to the LAN 2652, which may also include a wireless access point disposed thereon for communicating with the wireless functionality of the adaptor 2656.

When used in a WAN networking environment, the computer 2602 can include a modem 2658, or is connected to a communications server on the WAN 2654, or has other means for establishing communications over the WAN 2654, such as by way of the Internet. The modem 2658, which can be internal or external and a wire and/or wireless device, connects to the system bus 2608 via the input device interface 2642. In a networked environment, program modules depicted relative to the computer 2602, or portions thereof, can be stored in the remote memory/storage device 2650. It will be appreciated that the network connections shown are exemplary and other means of establishing a communications link between the computers can be used.

The computer 2602 is operable to communicate with wire and wireless devices or entities using the IEEE 802 family of standards, such as wireless devices operatively disposed in wireless communication (e.g., IEEE 802.26 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.26x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 27:
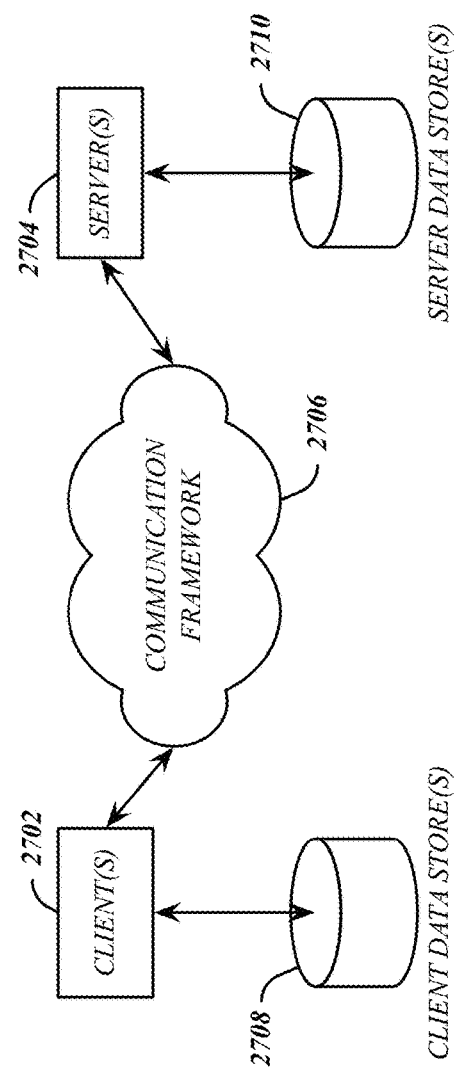
FIG. 27 illustrates an embodiment of a communications architecture.

FIG. 27 illustrates a block diagram of an exemplary communications architecture 2700 suitable for implementing various embodiments as previously described. The communications architecture 2700 includes various common communications elements, such as a transmitter, receiver, transceiver, radio, network interface, baseband processor, antenna, amplifiers, filters, power supplies, and so forth. The embodiments, however, are not limited to implementation by the communications architecture 2700.

As shown in FIG. 27, the communications architecture 2700 comprises includes one or more clients 2702 and servers 2704. The clients 2702 may implement the mobile device 110 or mobile device 120. The servers 2704 may implement the device 1820 or servers 1910, 1920, and 1930. The clients 2702 and the servers 2704 are operatively connected to one or more respective client data stores 2708 and server data stores 2710 that can be employed to store information local to the respective clients 2702 and servers 2704, such as cookies and/or associated contextual information. For example, the server data stores 2710 may be employed to store the location database 145.

The clients 2702 and the servers 2704 may communicate information between each other using a communication framework 2706. The communications framework 2706 may implement any well-known communications techniques and protocols. The communications framework 2706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 2706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2702 and the servers 2704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
receiving a location data package including a tuple comprising at least a location and a wireless transmitter identifier;
determining, for each received tuple, when a location database contains a cluster of tuples, each tuple in the cluster having the same wireless transmitter identifier as the received tuple;
assigning the received tuple to the cluster when the location falls within a pre-defined distance from the estimated position of the wireless transmitter associated with the cluster, the pre-defined distance comprising an estimated coverage range for a wireless transmitter of a given type;
estimating, for each cluster of tuples in the location database, a location of a wireless transmitter having an identifier matching the wireless transmitter identifier associated with the cluster;
receiving a request for location assistance from a mobile device, the request comprising a requested identifier identifying a wireless transmitter to which the device is connected;
identifying a cluster in the location database having an associated wireless transmitter identifier matching the requested identifier;
estimating a coverage area for the wireless transmitter comprising an area within the pre-defined distance from the estimated location of each wireless transmitter; and
sending the estimated location of the wireless transmitter associated with the identified cluster to the mobile device, wherein the estimated location of the wireless transmitter returned to the mobile device is the estimated coverage area of the wireless transmitter.

2. The method of claim 1, wherein the location database contains multiple clusters having the same wireless transmitter identifier as the received tuple.

3. The method of claim 2, further comprising:
splitting a cluster into two or more clusters when one or more of the tuples having a wireless transmitter identifier associated with the cluster also has a location which falls outside of the pre-defined distance from the estimated location of the wireless transmitter associated with the cluster.

4. The method of claim 1, wherein the received tuple includes a location and multiple wireless transmitter identifiers or wherein multiple location data packages are received, the location data packages including tuples having matching locations but different wireless transmitter identifiers.

5. The method of claim 1, wherein the location data package is received as part of a communication between a mobile device and a server, the communication being a request to the server for a network-based service.

6. An apparatus, comprising:
a processor circuit;
a storage medium arranged to store a location database comprising tuples of locations and wireless transmitter identifiers;
a logging component operative on the processor circuit to:
receive a location data package including a tuple comprising at least a location and a wireless transmitter identifier;
an analysis component operative on the processor circuit to:
determine, for each received tuple, when a location database contains a cluster of tuples, each tuple in the cluster having the same wireless transmitter identifier as the received tuple; and
assign the received tuple to the cluster when the location falls within a pre-defined distance from the estimated position of the wireless transmitter associated with the cluster, the pre-defined distance comprising an estimated coverage range for a wireless transmitter of a given type; and
a location estimation component operative on the processor circuit to:
estimate, for each cluster of tuples in the location database, a location of a wireless transmitter having an identifier matching the wireless transmitter identifier associated with the cluster;
receive a request for location assistance from a mobile device, the request comprising a requested identifier identifying a wireless transmitter to which the device is connected;
identify a cluster in the location database having an associated wireless transmitter identifier matching the requested identifier;
estimate a coverage area for the wireless transmitter comprising an area within the pre-defined distance from the estimated location of the wireless transmitter; and
send the estimated location of the wireless transmitter associated with the identified cluster to the mobile device, wherein the estimated location of the wireless transmitter returned to the mobile device is the estimated coverage area of the wireless transmitter.

7. The apparatus of claim 6, wherein the received tuple includes a location and multiple wireless transmitter identifiers or wherein multiple location packages are received, location data packages including tuples having matching locations but different wireless transmitter identifiers.

8. The apparatus of claim 6, wherein the location database contains multiple clusters having the same wireless transmitter identifier as the received tuple.

9. The apparatus of claim 6, wherein the location packages are received as part of a communication between a mobile device and the server, the communication being a request to the server for a network-based service.

10. A non-transitory computer-readable storage medium comprising instructions that, when executed, cause a system to:
- receive a location data package including a tuple comprising at least a location and a wireless transmitter identifier;
- determine, for each received tuple, when a location database contains a cluster of tuples, each tuple in the cluster having the same wireless transmitter identifier as the received tuple;
- assign the received tuple to the cluster when the location falls within a pre-defined distance from the estimated position of the wireless transmitter associated with the cluster, the pre-defined distance comprising an estimated coverage range for a wireless transmitter of a given type;
- estimate, for each cluster of tuples in the location database, a location of a wireless transmitter having an identifier matching the wireless transmitter identifier associated with the cluster;
- receive a request for location assistance from a mobile device, the request comprising a requested identifier identifying a wireless transmitter to which the device is connected;
- identify a cluster in the location database having an associated wireless transmitter identifier matching the requested identifier;
- estimate a coverage area for the wireless transmitter comprising an area within the pre-defined distance from the estimated location of each wireless transmitter; and
- the estimated location of the wireless transmitter associated with the identified cluster to the mobile device, wherein the estimated location of the wireless transmitter returned to the mobile device is the estimated coverage area of the wireless transmitter.

11. The computer-readable storage medium of claim 10, wherein the received tuple includes a location and multiple wireless transmitter identifiers or wherein multiple location data packages are received, the location data packages including tuples having matching locations but different wireless transmitter identifiers.

12. The computer-readable storage medium of claim 10, comprising further instructions that, when executed, cause a system to:
- split a cluster in the two or more clusters when one or more of the tuples having a wireless transmitter identifier associated with the cluster also has a location which falls outside of the pre-defined distance from the estimated location of the wireless transmitter associated with the cluster.

13. The computer-readable storage medium of claim 10, wherein the location data package is received as part of a communication between a mobile device and a server, the communication being a request to the server for a network-based service.

* * * * *